(12) United States Patent
Payne

(10) Patent No.: US 8,631,551 B1
(45) Date of Patent: Jan. 21, 2014

(54) READILY INSTALLABLE FENCE SYSTEM, AND METHOD THEREFOR

(75) Inventor: John F. Payne, Ennis, TX (US)

(73) Assignee: Betafence USA, LLC, Ennis, TX (US)

( * ) Notice: Subject to any disclaimer, the term of this patent is extended or adjusted under 35 U.S.C. 154(b) by 1309 days.

(21) Appl. No.: 12/120,987

(22) Filed: May 15, 2008

Related U.S. Application Data

(62) Division of application No. 11/669,943, filed on Jan. 31, 2007.

(60) Provisional application No. 60/763,715, filed on Jan. 31, 2006.

(51) Int. Cl.
*B21D 39/03* (2006.01)
*B23P 11/00* (2006.01)

(52) U.S. Cl.
USPC .............. 29/428; 256/65.11; 256/24

(58) Field of Classification Search
USPC ........... 256/24, 26, 45, 73, 29, 30, 31, 62, 63, 256/64, 65.08, 65.11, 65.15; 29/428, 434, 29/525.01
See application file for complete search history.

(56) References Cited

U.S. PATENT DOCUMENTS

| | | | |
|---|---|---|---|
| 256,860 A * | 4/1882 | Rood | 52/63 |
| 498,576 A * | 5/1893 | Sanford | 52/764 |
| 1,183,562 A * | 5/1916 | Howard | 256/41 |
| 1,204,126 A | 11/1916 | Butzer | |
| 1,426,215 A * | 8/1922 | Ravert | 256/24 |
| 1,714,388 A | 5/1929 | McBride | |
| 2,475,416 A * | 7/1949 | Williams | 256/25 |
| 3,140,858 A | 7/1964 | Westphal | |
| 3,193,255 A | 7/1965 | Burdett | |
| 3,323,530 A | 6/1967 | Smith | |
| 3,604,686 A | 9/1971 | Parisien | |
| 3,734,467 A | 5/1973 | Weeden | |
| 3,770,245 A | 11/1973 | Murdock | |
| 3,881,699 A | 5/1975 | Nusbaum | |
| 4,098,493 A | 7/1978 | Logan | |
| 4,255,913 A | 3/1981 | Poma | |
| 4,266,757 A | 5/1981 | Kirkwood | |
| 5,007,587 A | 4/1991 | Daroca | |
| 5,141,207 A | 8/1992 | Meglino et al. | |
| 5,275,382 A | 1/1994 | Charbaut et al. | |
| 5,341,610 A | 8/1994 | Moss | |
| 5,421,557 A * | 6/1995 | Vise | 256/24 |
| 5,480,126 A | 1/1996 | Teasdale | |
| 5,542,649 A | 8/1996 | Allegaert et al. | |
| 5,556,080 A * | 9/1996 | Vise | 256/24 |
| 5,664,769 A * | 9/1997 | Sadinsky et al. | 256/73 |
| 5,676,351 A | 10/1997 | Speece et al. | |
| 5,718,414 A * | 2/1998 | Deloach et al. | 256/24 |
| 5,730,426 A | 3/1998 | Tu | |
| 5,794,990 A | 8/1998 | Coppedge | |

(Continued)

FOREIGN PATENT DOCUMENTS

| FR | 2785635 | 5/2000 |
|---|---|---|
| WO | 9611317 | 4/1996 |

*Primary Examiner* — David Bryant
*Assistant Examiner* — Christopher Koehler
(74) *Attorney, Agent, or Firm* — Jack D. Stone, Jr.; Scheef & Stone, L.L.P.

(57) ABSTRACT

A fence includes a plurality of posts, and fence panels having rails which extend across the plurality of posts, and are secured thereto. Jambs may be formed onto the fence system, and one or more gates may be hung to the jambs.

12 Claims, 27 Drawing Sheets

(56) References Cited

U.S. PATENT DOCUMENTS

| | | | |
|---|---|---|---|
| 6,123,321 A * | 9/2000 | Miller | 256/25 |
| 6,217,007 B1 | 4/2001 | Grayson, II et al. | |
| 6,557,666 B1 | 5/2003 | Drouin | |
| 6,561,493 B1 * | 5/2003 | Lackey, Jr. | 256/73 |
| 6,581,914 B2 | 6/2003 | Saura Sotillos et al. | |
| 6,789,786 B1 * | 9/2004 | Schatzberg | 256/25 |
| 2003/0209701 A1 | 11/2003 | Goddard | |
| 2004/0206946 A1 * | 10/2004 | Lappen | 256/24 |
| 2006/0226406 A1 | 10/2006 | Vise | |
| 2006/0231821 A1 * | 10/2006 | Gavin | 256/73 |
| 2007/0272909 A1 | 11/2007 | Payne | |

* cited by examiner

FIG. 9
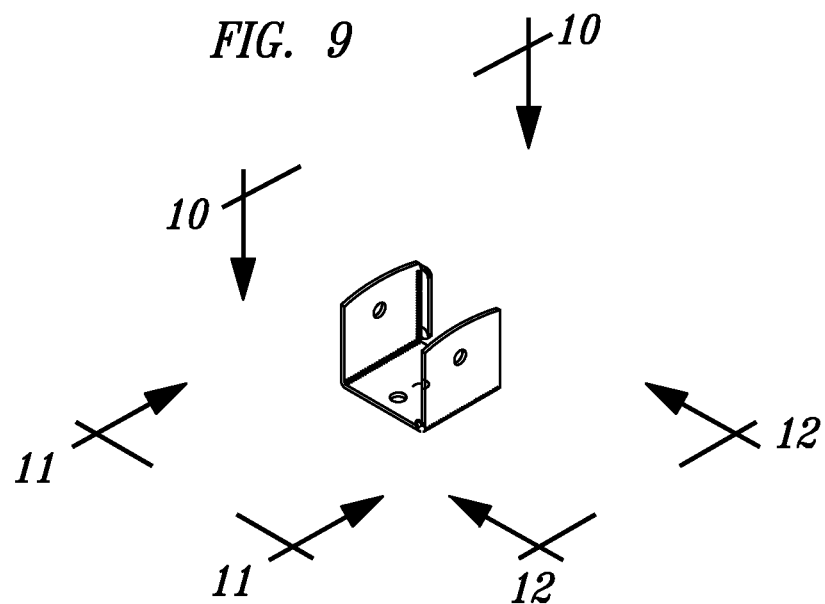
FIG. 10
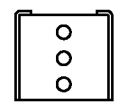
FIG. 11  FIG. 12
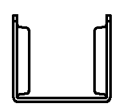  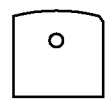
FIG. 13
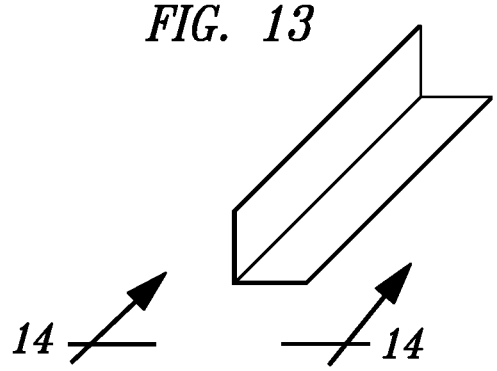
FIG. 14

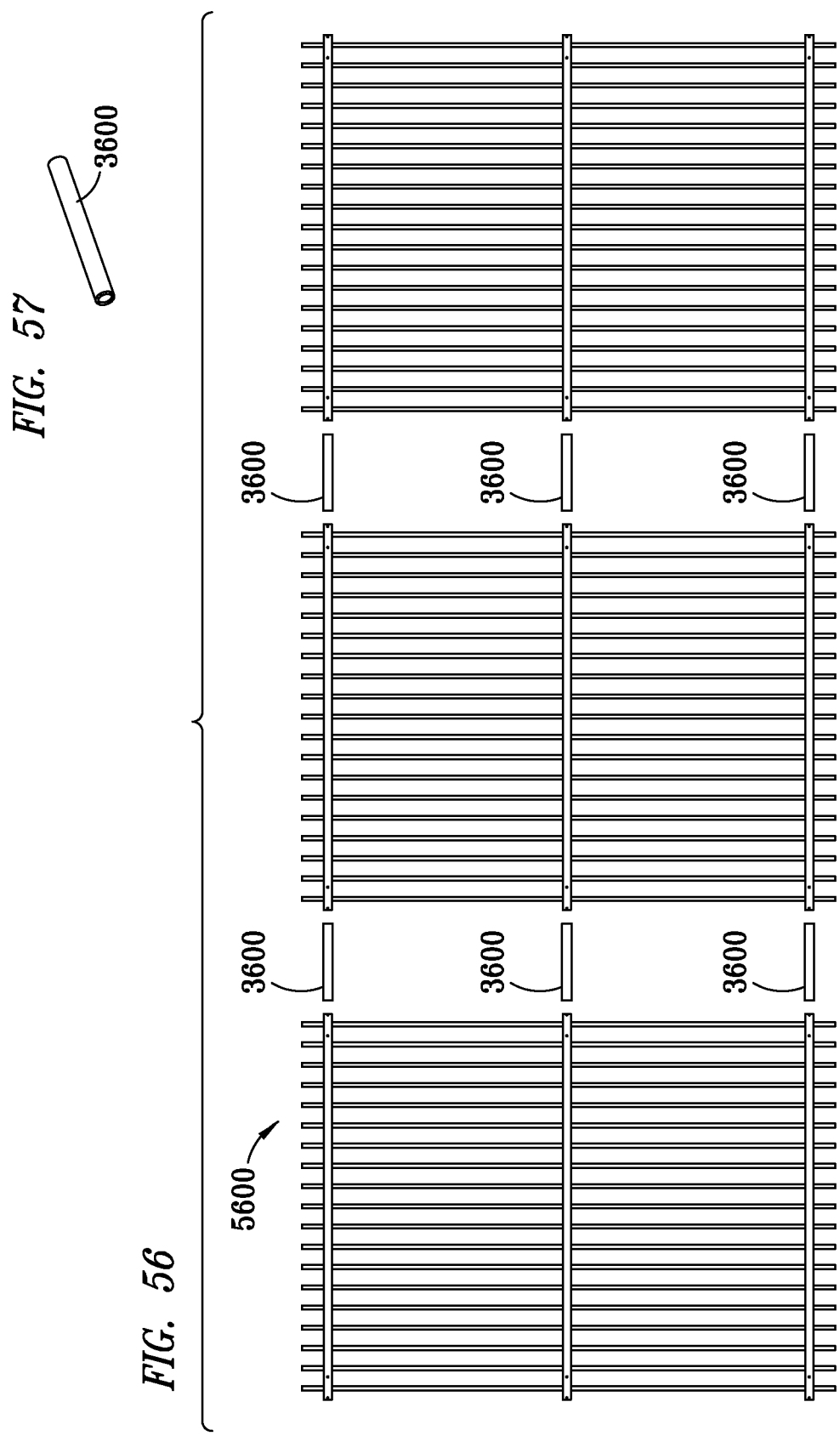

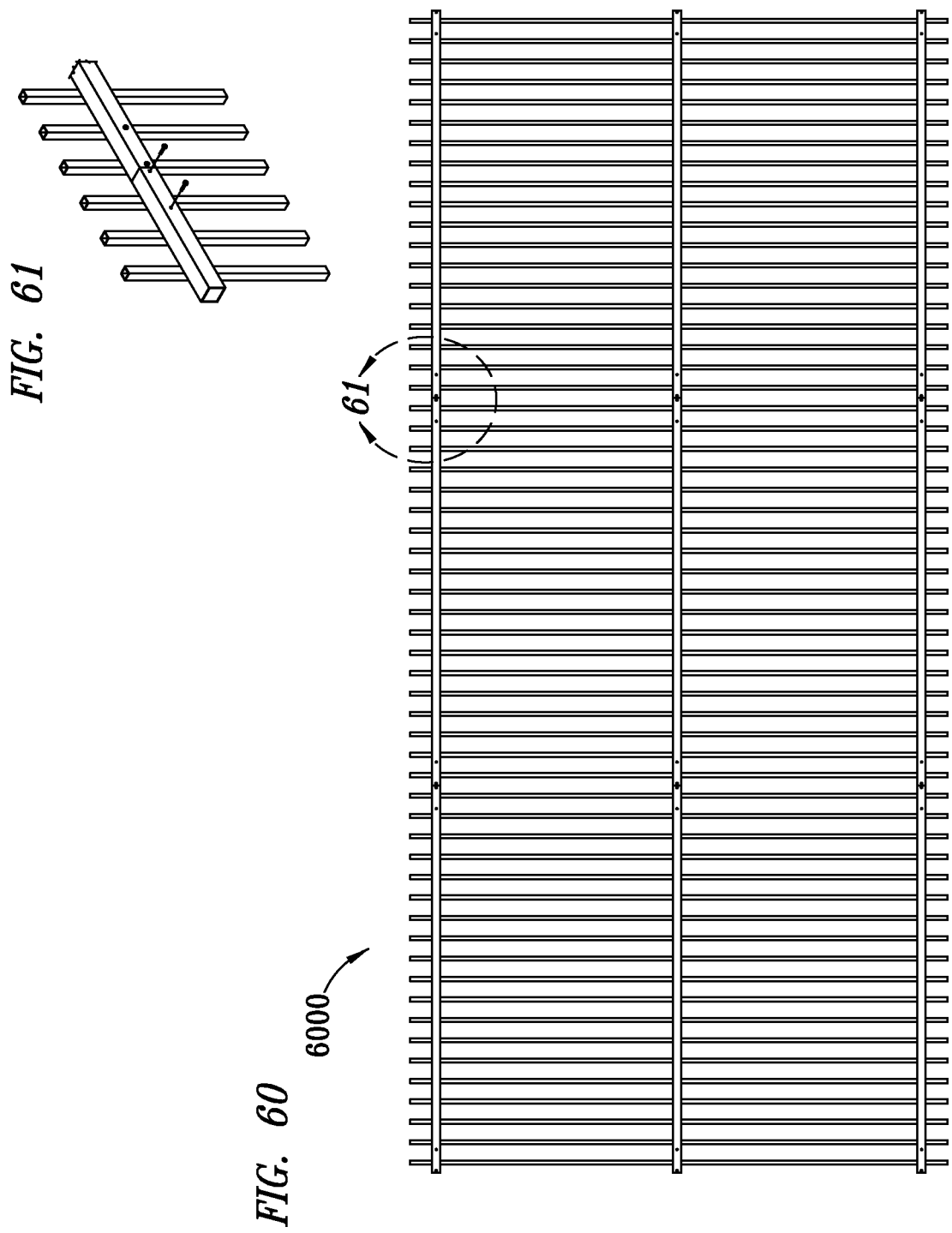

6200

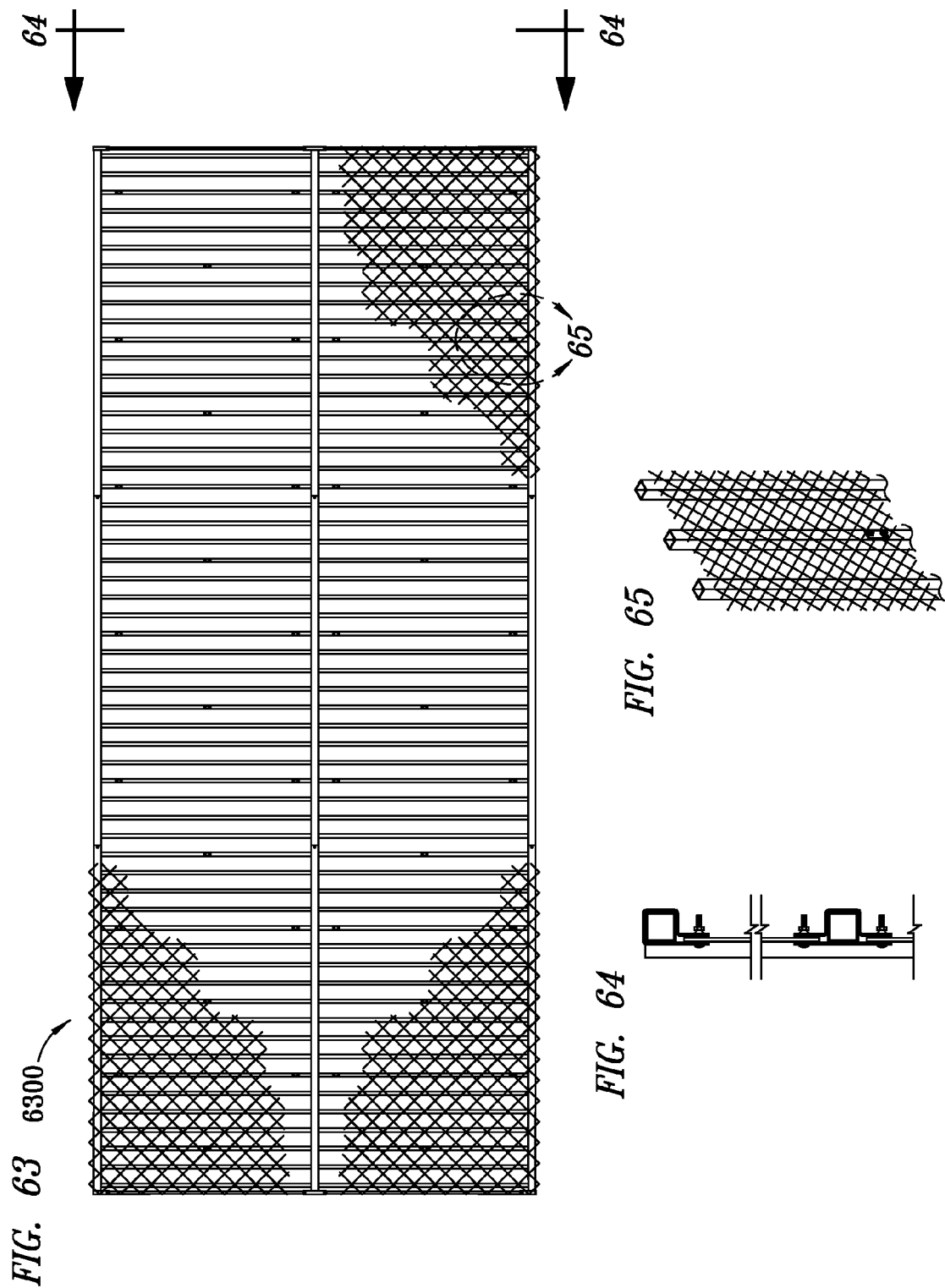

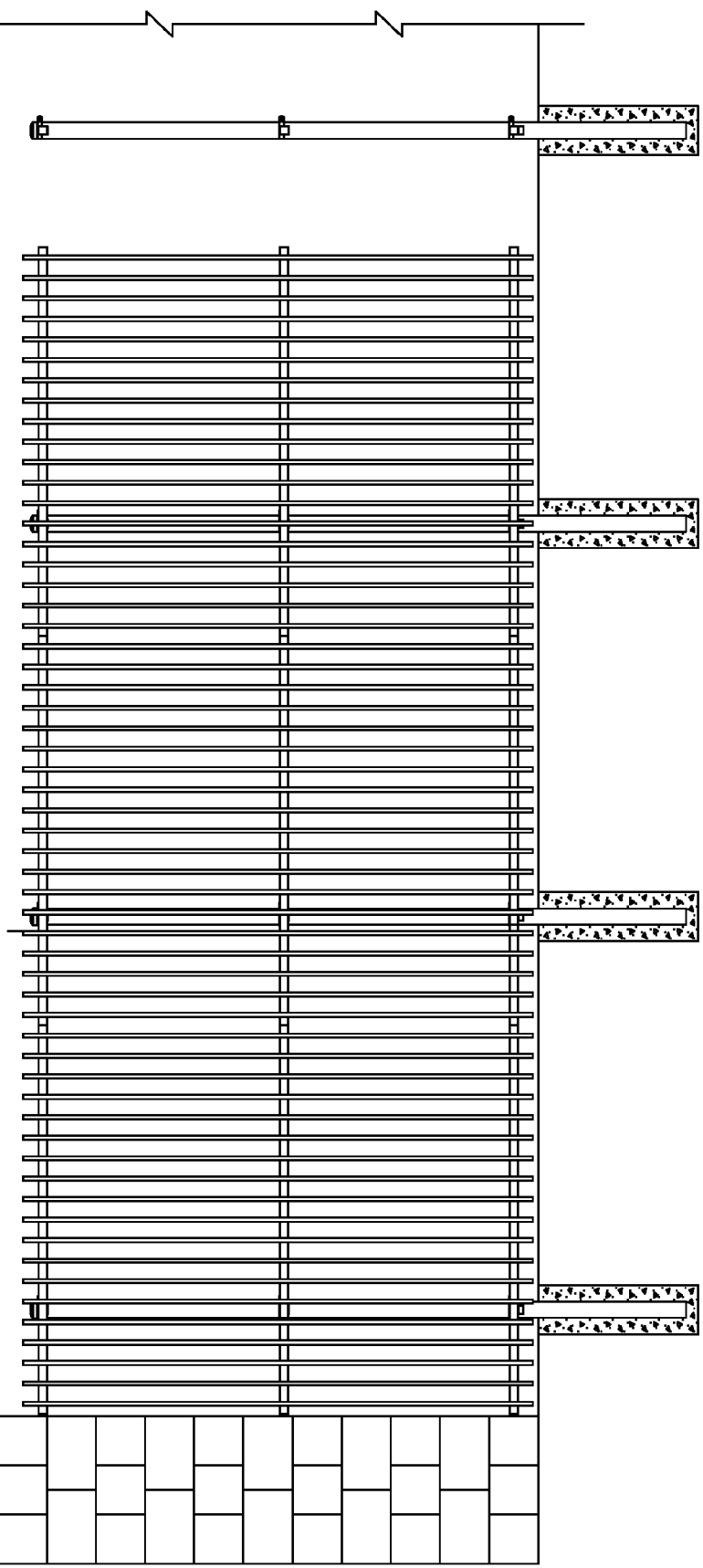
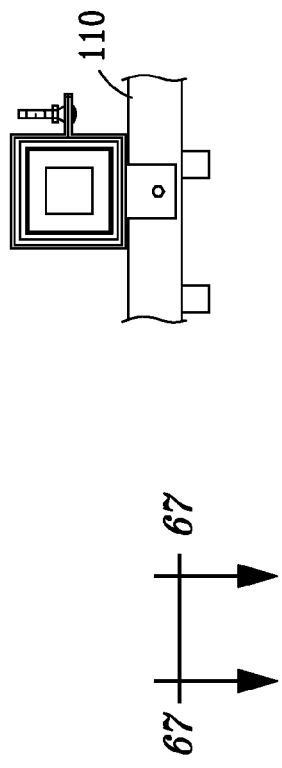
FIG. 67
FIG. 66

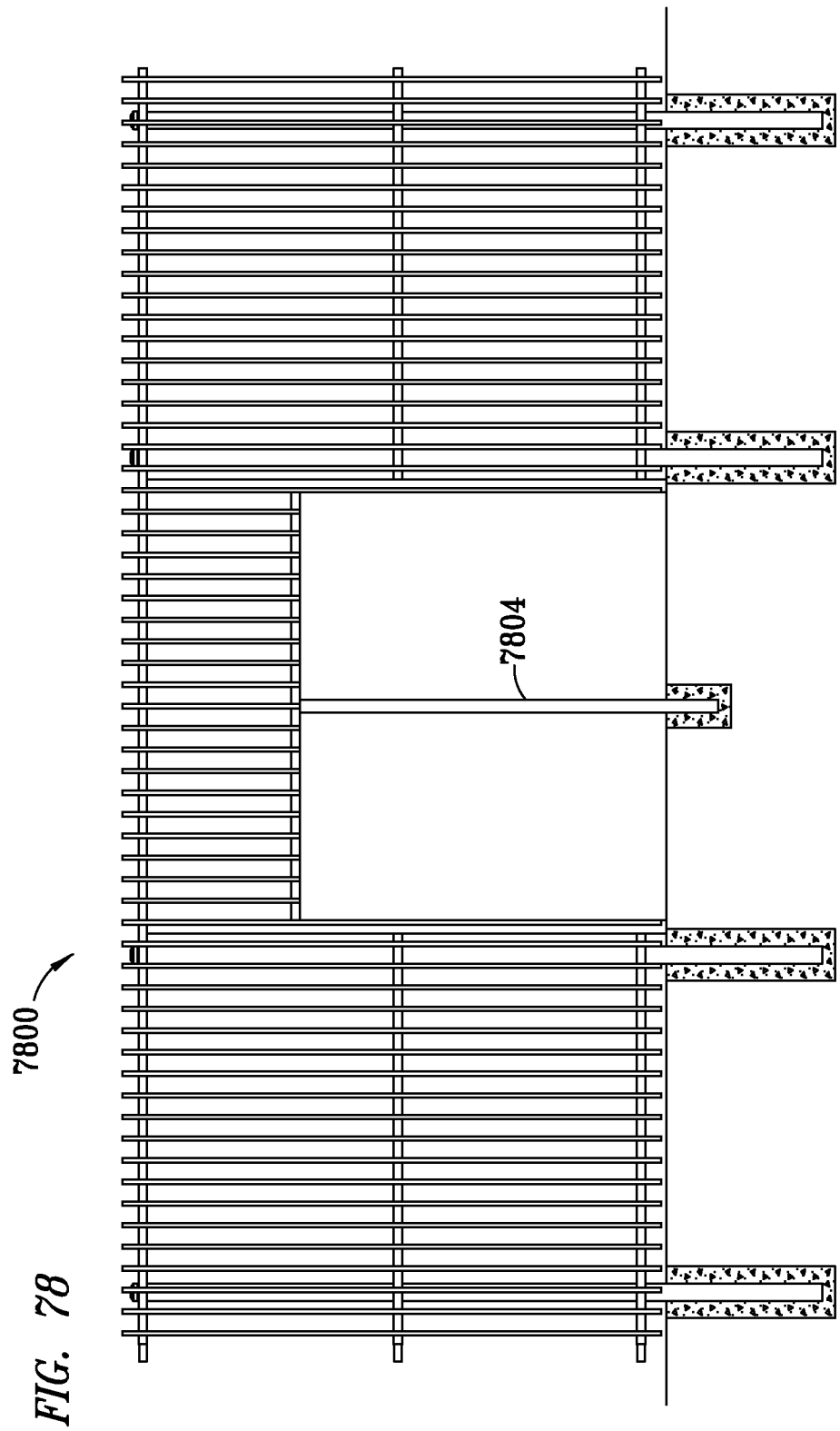

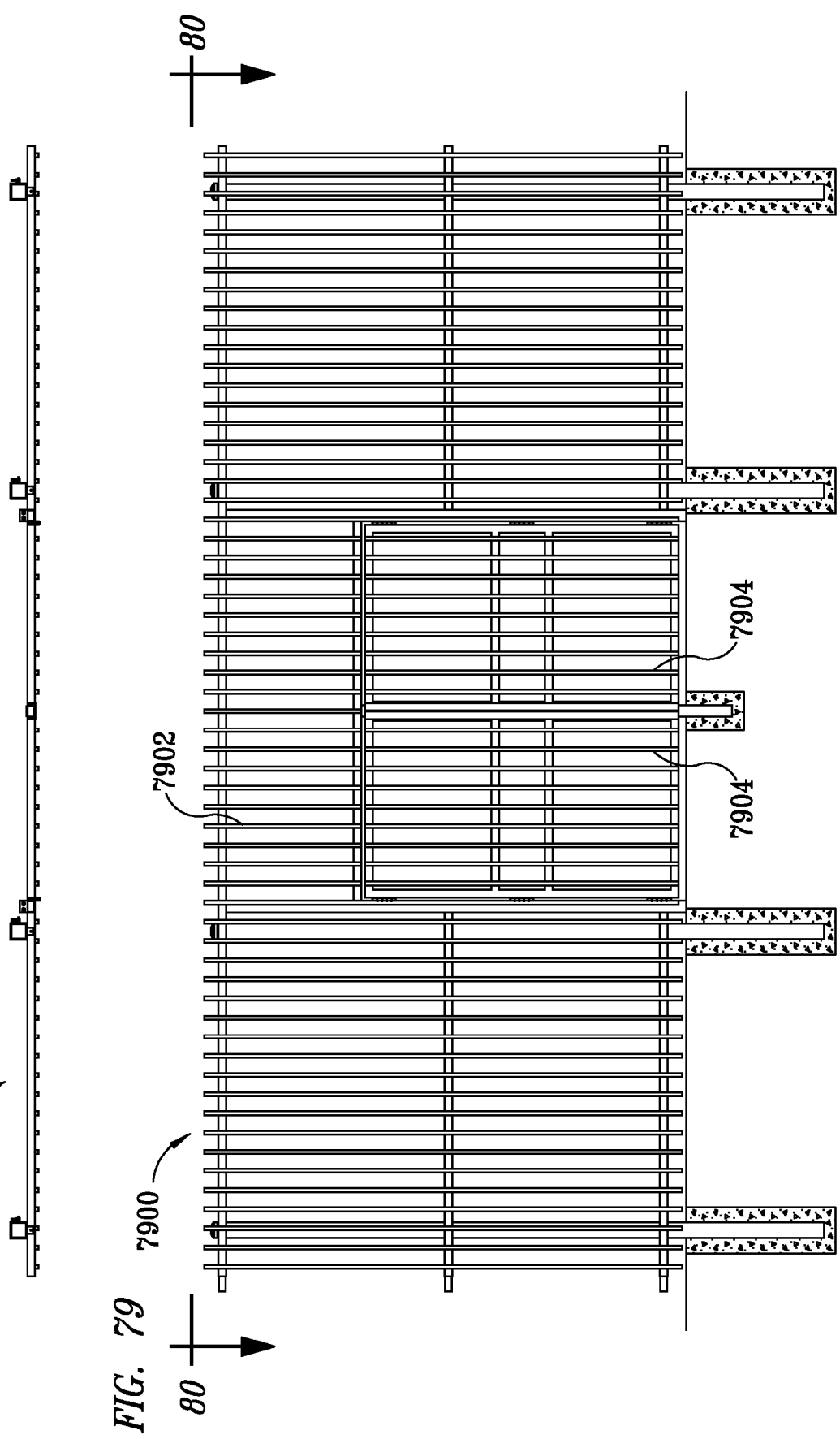

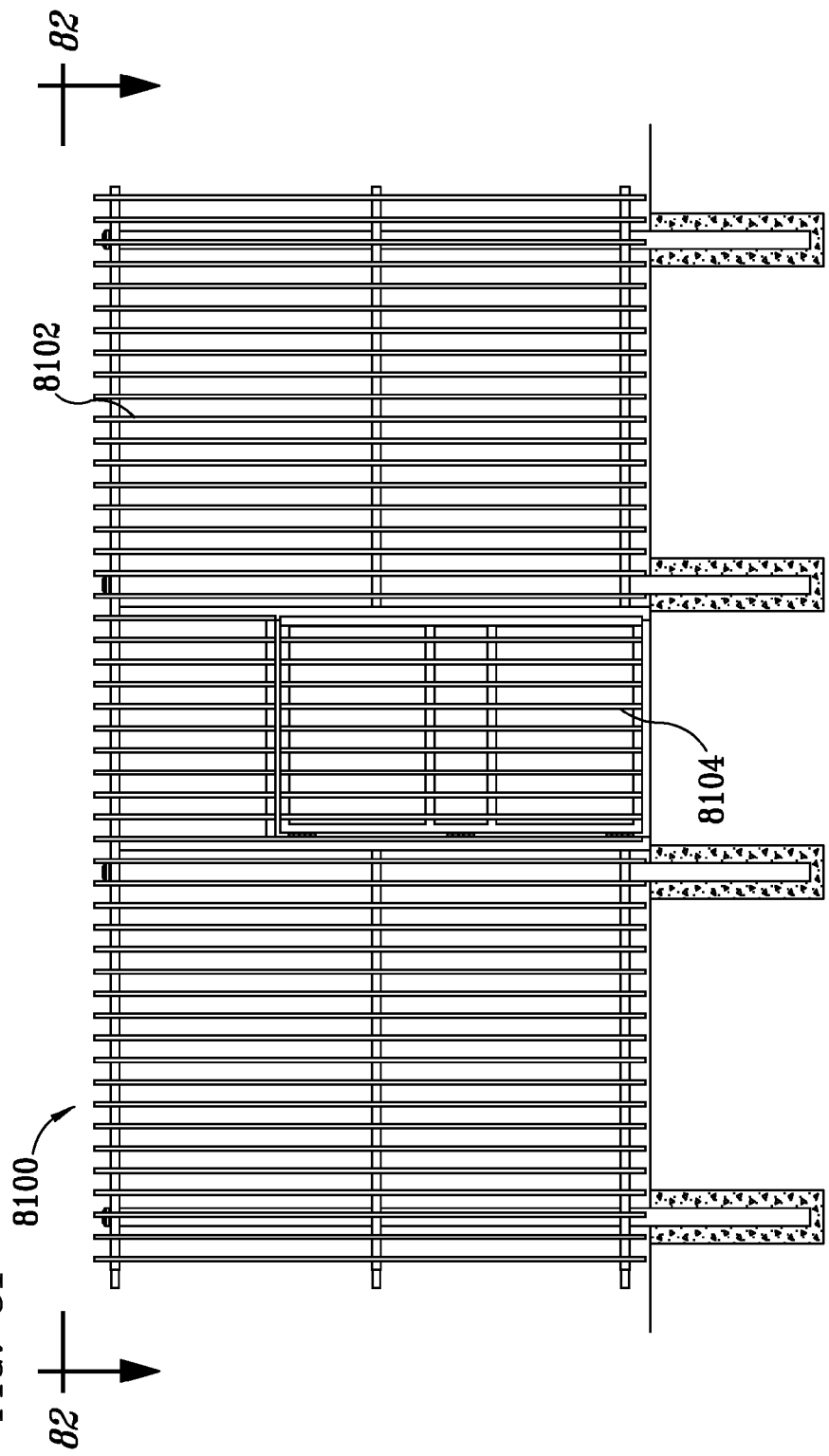
FIG. 81
FIG. 82

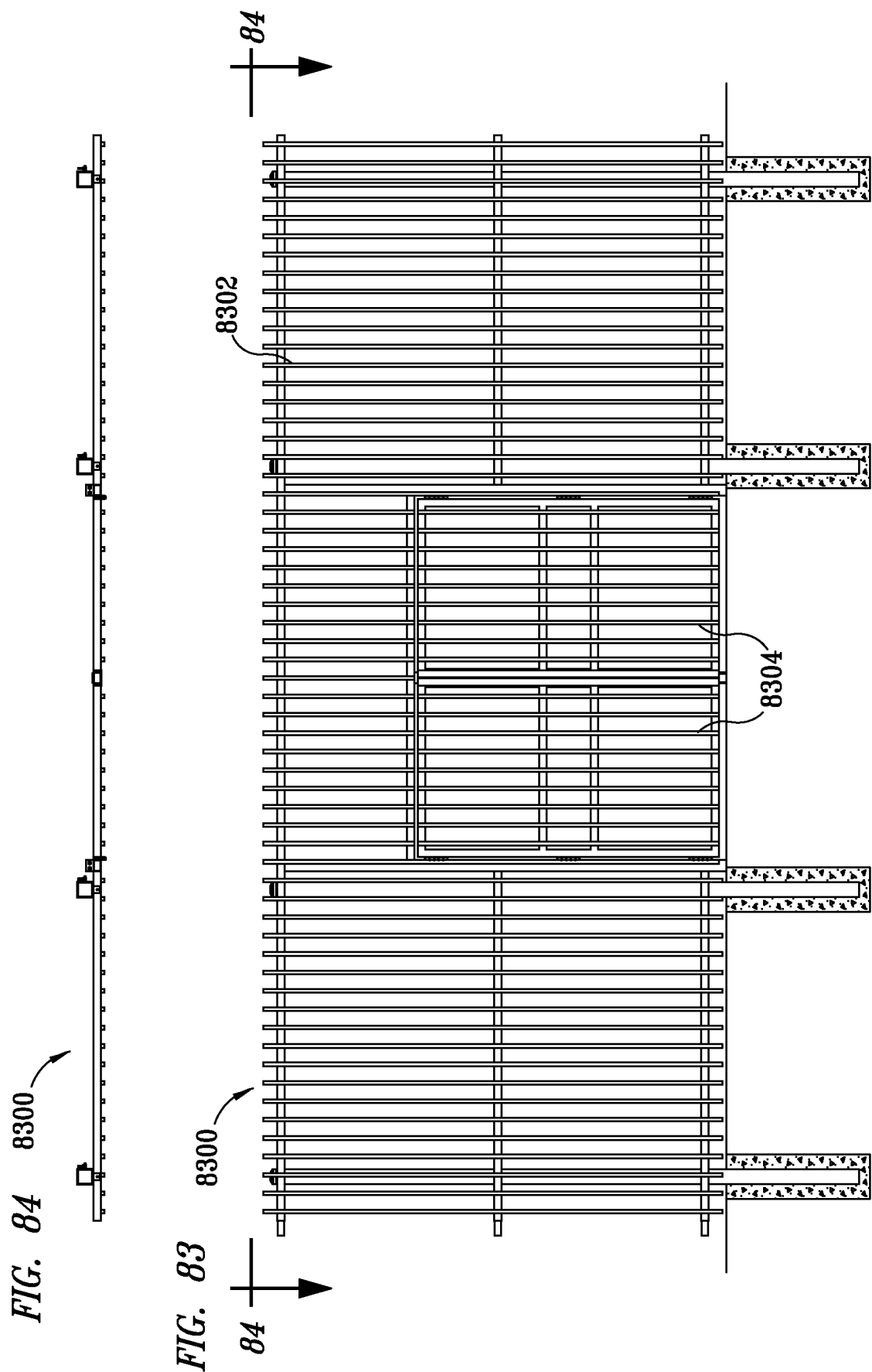

8900

8700

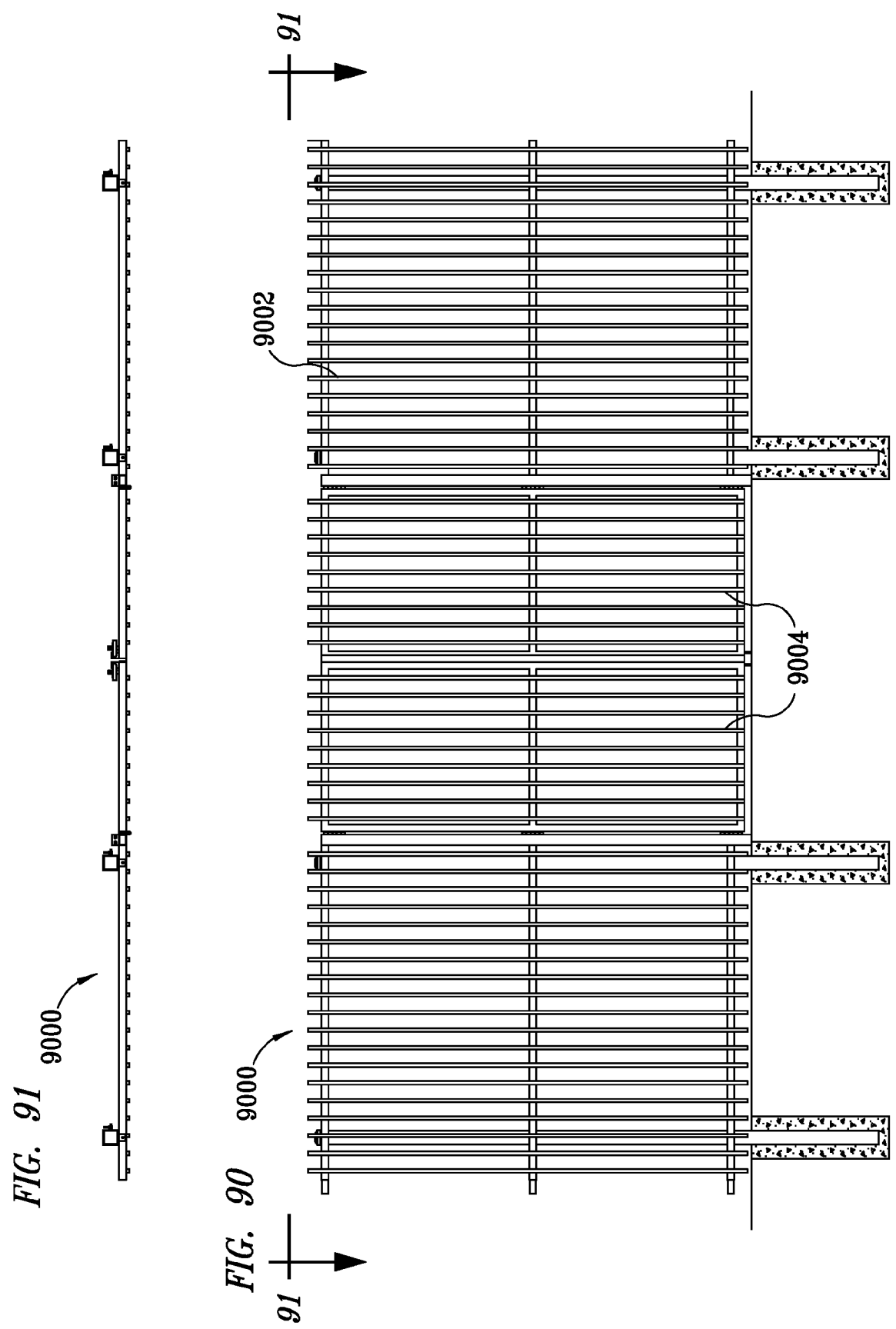

READILY INSTALLABLE FENCE SYSTEM, AND METHOD THEREFOR

CROSS-REFERENCE TO RELATED APPLICATIONS

This application is a divisional application of prior application Ser. No. 11/669,943, filed Jan. 31, 2007, which claims the benefit of U.S. Provisional Application No. 60/763,715, filed Jan. 31, 2006, both of which applications are incorporated by reference herein in their respective entireties.

TECHNICAL FIELD

The invention relates generally to fences, and more particularly, to a fence, and a method for making a fence, configured for quick installation and preferably also for providing ornamental security.

BACKGROUND

Fences are well known in the art for providing security to property. However, the installation of conventional fences can be laborious and inefficient. Attempts have been made to provide fences that are simpler and quicker to install, such as by providing mechanical fittings in place of welded fittings. However, mechanical fittings are often difficult to use, for example, with gates that are hung from posts that are spaced apart at irregularly intervals.

Not only can it be laborious and inefficient to install conventional fences, but conventional fences also lack aesthetic appeal.

Therefore, it would be desirable for a fence to not only provide security, but to also be relatively simple and quick to install and have aesthetic appeal.

SUMMARY

A fence includes a plurality of fence posts, and fence panels having rails which extend across the plurality of posts, and are secured thereto. Jambs may be formed onto the fence system, and one or more gates may be hung to the jambs.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the accompanying drawings, in which:

FIGS. 9-12 exemplify a panel hanger, used to secure a rail on an inside corner connection in accordance with principles of the present invention;

FIGS. 13-14 exemplify gate and hook trim in accordance with principles of the present invention;

FIGS. 56-57 exemplifies a layout of the assembly of panels for use with the fence;

FIGS. 60-61 exemplify the panel assemblies of FIG. 56 pressed together;

FIGS. 63-65 exemplify the application of chain link tension rods and rod brackets onto the panel assemblies of FIG. 60;

FIGS. 66-68 exemplify how the panels of FIG. 60 are lifted and positioned on the posts of FIGS. 54-55.

FIG. 78 exemplifies the installation of a mullion post where applicable for a gate;

FIGS. 79-80 exemplify gate section construction detail for double gate with center post and transom;

FIGS. 81-82 exemplify gate section construction detail for a single gate with a transom;

FIGS. 83-84 exemplify gate section construction detail for a double gate with a drop rod and transom;

FIGS. 90-91 exemplify gate section construction detail for a double gate with a drop rod.

DETAILED DESCRIPTION

Figure 1:
FIG. 1 exemplifies a carriage bolt and a breakaway nut used to secure a rail hanger to a post in assembly a fence in accordance with the principles of the present invention.
Figure 2:
FIG. 2 exemplifies a TEK screw used to secure a rail hanger to a post in assembling a fence in accordance with principles of the present invention.
Figure 3:
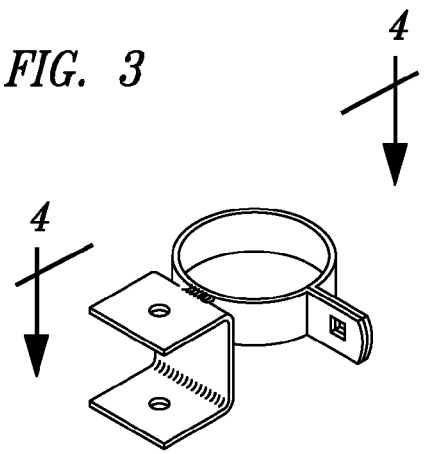
FIGS. 3-5 exemplify a round post rail hanger, used to secure a rail to a post in accordance with principles of the present invention.
Figure 4:
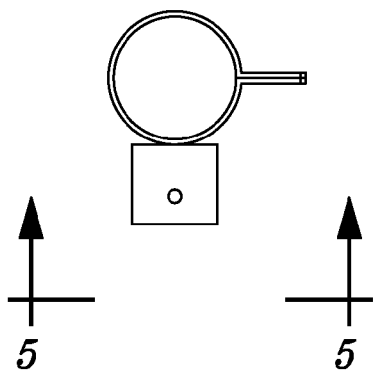
Figure 5:
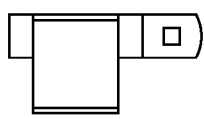
Figure 6:
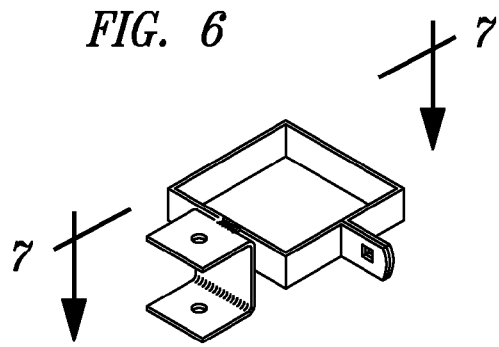
FIGS. 6-8 exemplify a square post rail hanger, used to secure a rail to a post in accordance with principles of the present invention.
Figure 7:
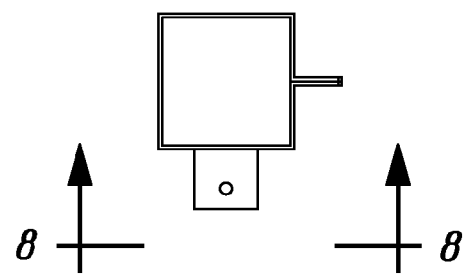
Figure 8:
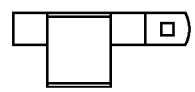
Figure 15:
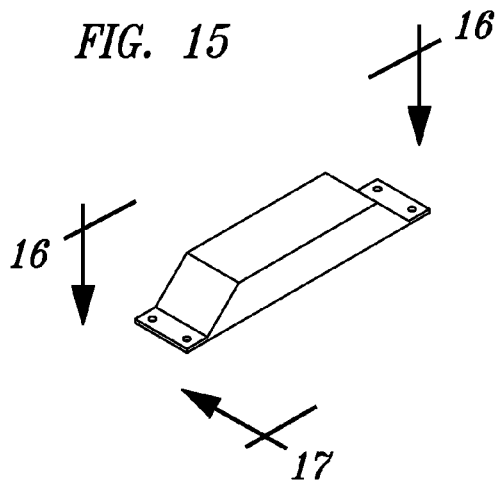
FIGS. 15-17 exemplify an egress gate panic hardware mounting plate in accordance with principles of the present invention.
Figure 18:
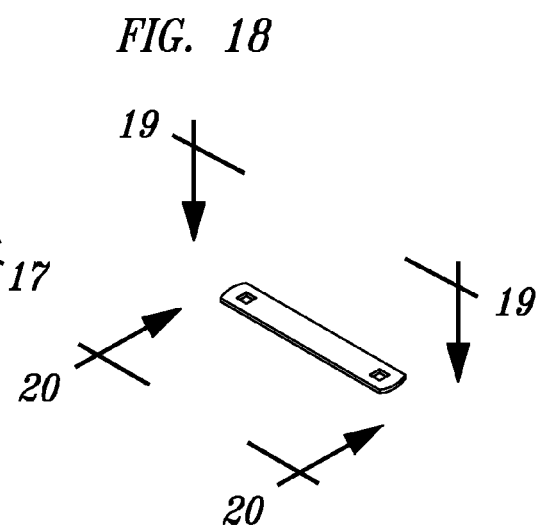
FIGS. 18-24 exemplify a square double tension band used to attach tension bars to middle rails at ends of panels in accordance with principles of the present invention.
Figure 16:
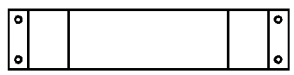
Figure 19:
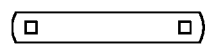
Figure 17:
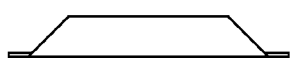
Figure 20:
Figure 21:
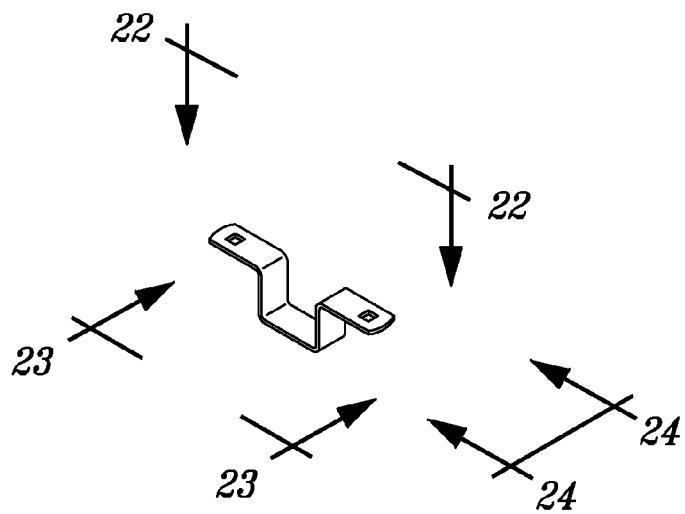
Figure 22:
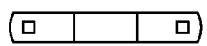
Figure 23:
Figure 24:
Figure 25:
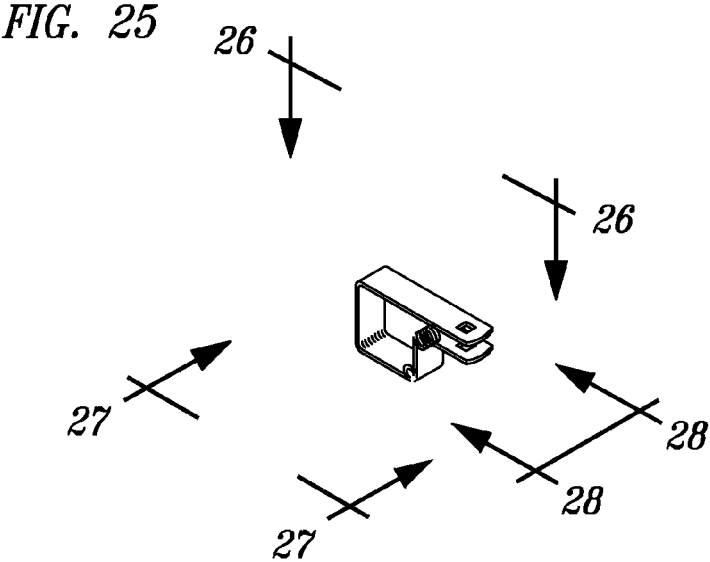
FIGS. 25-28 exemplify a square single tension band used to attach tension bars to top and bottom rails at ends of panels in accordance with principles of the present invention.
Figure 26:
Figure 27:
Figure 28:
Figure 29:
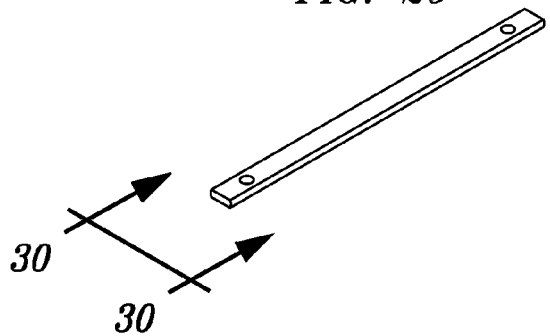
FIGS. 29-30 exemplify a tension rod used to attach chain link to rails in conjunction with tension rod brackets in accordance with principles of the present invention.
Figure 30:
Figure 31:
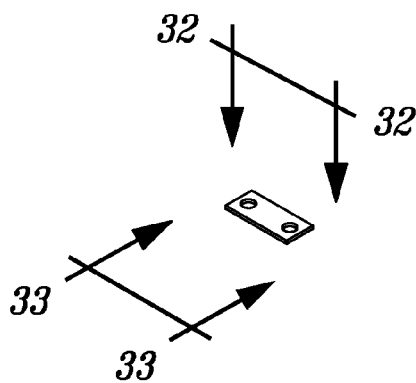
FIGS. 31-33 exemplify a chain link clip used to secure chain link to pickets in accordance with principles of the present invention.
Figure 32:
Figure 33:
Figure 34:
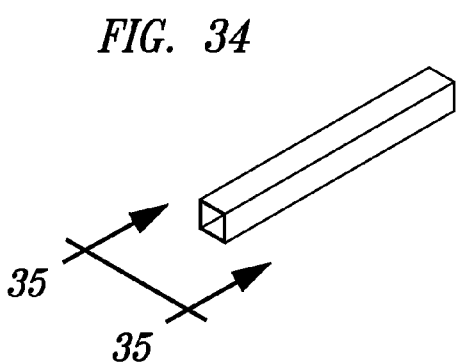
FIGS. 34-35 exemplify a splice used to assemble gate sections in accordance with principles of the present invention.
Figure 36:
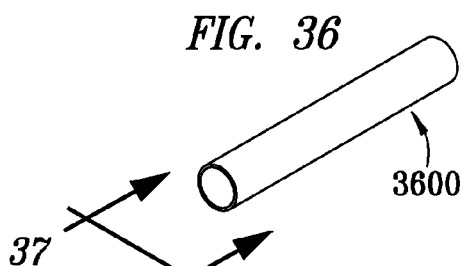
FIGS. 36-37 exemplify a splice used to assemble gate sections in accordance with principles of the present invention.
Figure 37:
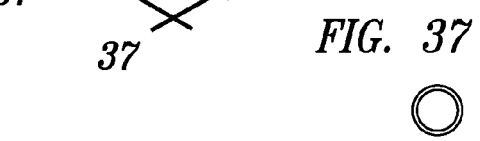
Figure 35:
Figure 42:
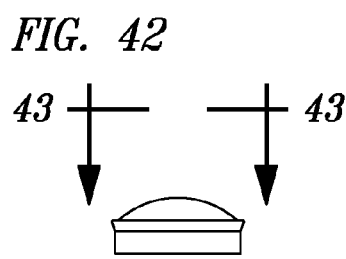
FIGS. 42-45 exemplify square and round post caps in accordance with principles of the present invention.
Figure 38:
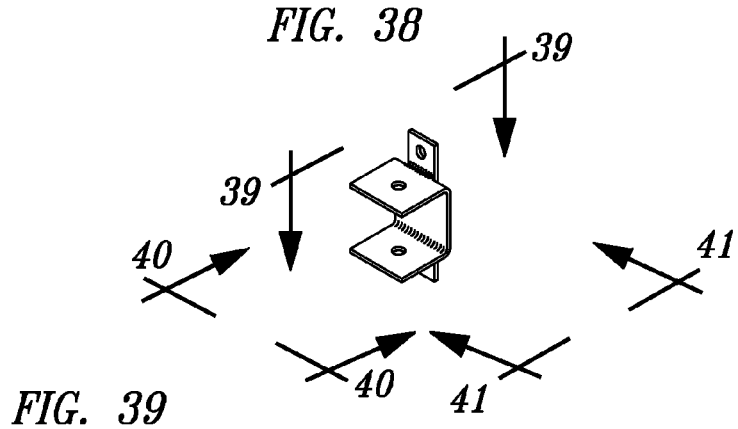
FIGS. 38-41 exemplify a swivel rail hanger used to secure a rail on sloping terrain applications in accordance with principles of the present invention.
Figure 43:
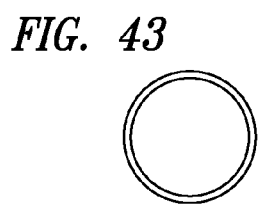
Figure 39:
Figure 40:
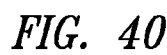
Figure 41:
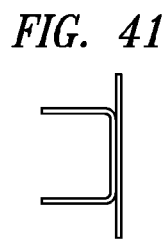
Figure 44:
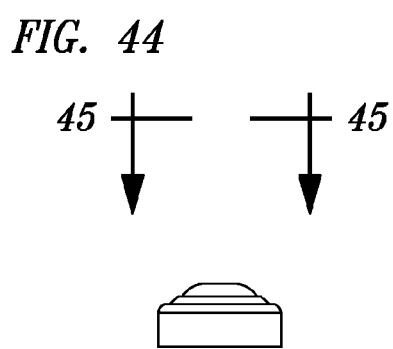
Figure 45:
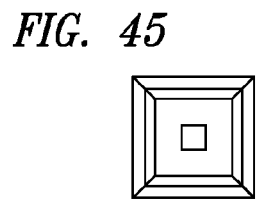
Figure 46:
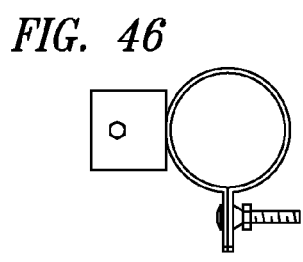
FIGS. 46-47 exemplify the placement of carriage bolts with the head of the bolt facing a rail in accordance with principles of the present invention.
Figure 47:
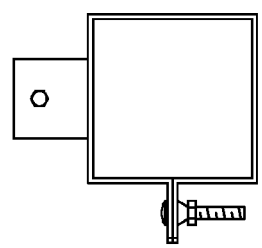
Figure 48:
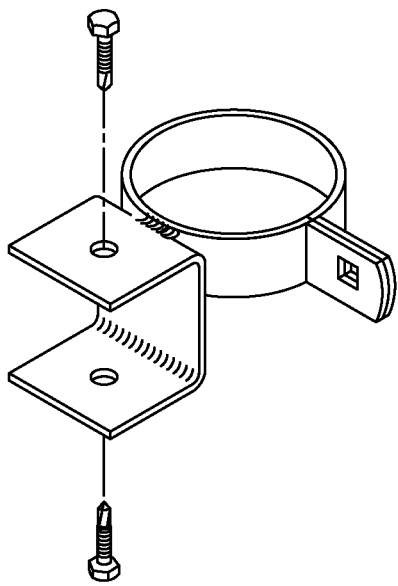
FIGS. 48-51 exemplify the location of TEK screws in accordance with principles of the present invention.
Figure 49:
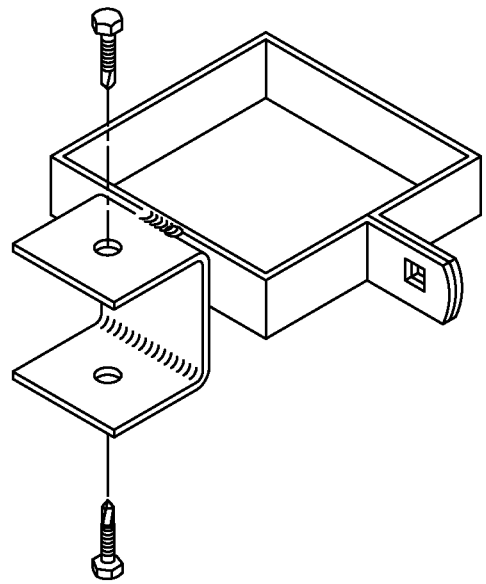
Figure 50:
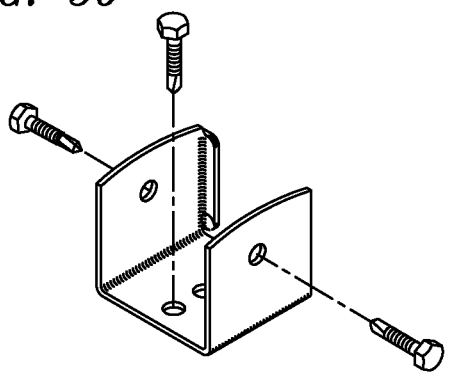
Figure 51:
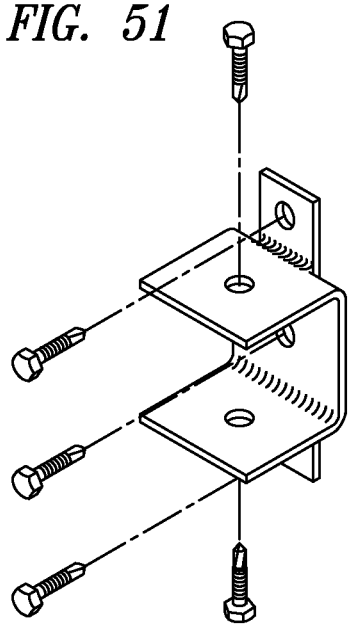

Refer now to the drawings wherein depicted elements are, for the sake of clarity, not necessarily shown to scale and wherein like or similar elements are designated by the same reference numeral through the several views. In the interest of conciseness, some components known to the art, and necessary for fences, have not been shown or discussed in detail, except insofar as necessary to describe the present invention.

The present invention constitutes a method for constructing an ornamental fence and for hanging gates that makes installation simpler and more efficient than is possible with existing systems by running the fence outside the line of the fence posts rather than in line with them.

A number of dimensions are depicted in the drawings. It is understood, however, that the dimensions depicted in the drawings are provided by way of example, and are not to be construed as constituting any limitation in the design or application of the embodiment of the invention described herein.

The fence of the present invention has a number of applications, particularly where ornamental fencing is required, including, but not limited to applications in connection with garden centers, recreational facilities, a commercial perimeter, a retail perimeter, and areas of transportation. Due to the configuration of the fence disclosed herein, it may be assembled relatively quickly and inexpensively, and is particularly well-suited for projects having irregular or inexact post settings.

As discussed in further detail below, with respect to FIGS. 52-91, in a preferred embodiment, the fence of the present invention may typically be assembled in five steps. First, fence posts are installed, or set, if not already set. The fence post settings or spacing does not have to be exact, because the fence runs outside the posts, rather than between them. Second, brackets are attached with a brace band attachment, which eliminates the need to tap into a heavy wall post. Third, fence panels to be used in the construction of the fence are assembled on the ground by being connected end-to-end using splices rather than welding. Fourth, sections of fence panels are assembled on the ground and then lifted from the ground, positioned onto the posts, and secured in place by being attached to the brackets. Fifth, gates are hung onto jambs integrated with the fence panels.

FIGS. 1-51 exemplify hardware and tools that are preferred in the assembly of the fence of the present invention. By way of example, but not limitation, fasteners, brackets, hangers, splices, and tension rods are types of hardware preferred in the assembly of the fence of the present invention. Drills, ladders, rubber mallets, wrenches, sockets, levels, and saws exemplify types of tools that would be preferred in the assembly of the fence of the present invention.

Figure 52:
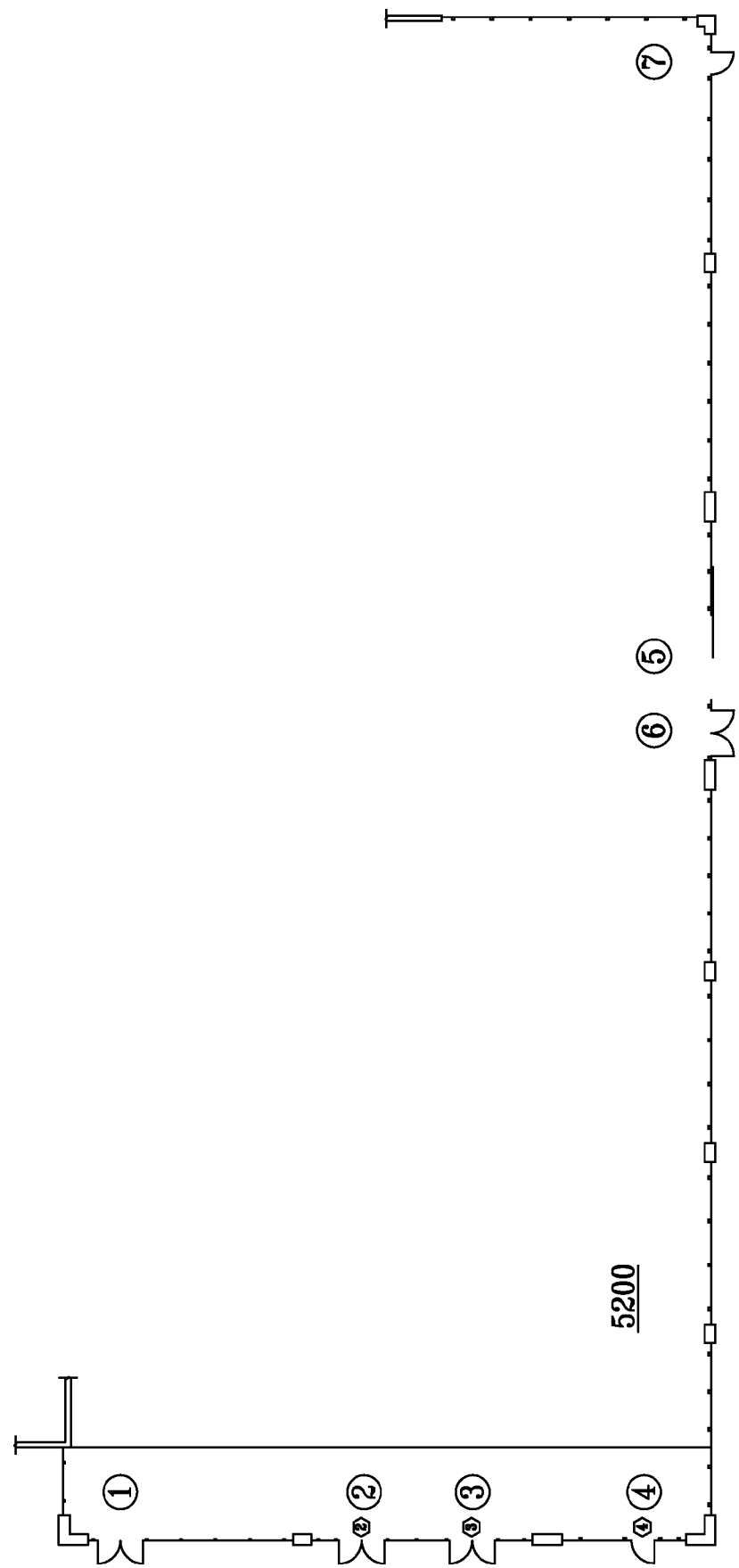
FIG. 52 exemplifies how a user may verify the area that needs to be secured using fencing according to the present invention.

As shown in FIG. 52, before the fence of the present invention may be set up, the exact area to be fenced must be identified and verified. Locations must also be identified where gates are to be positioned between the fence panels accordingly, as described further below with respect to FIGS. 74-91.

Figure 53:
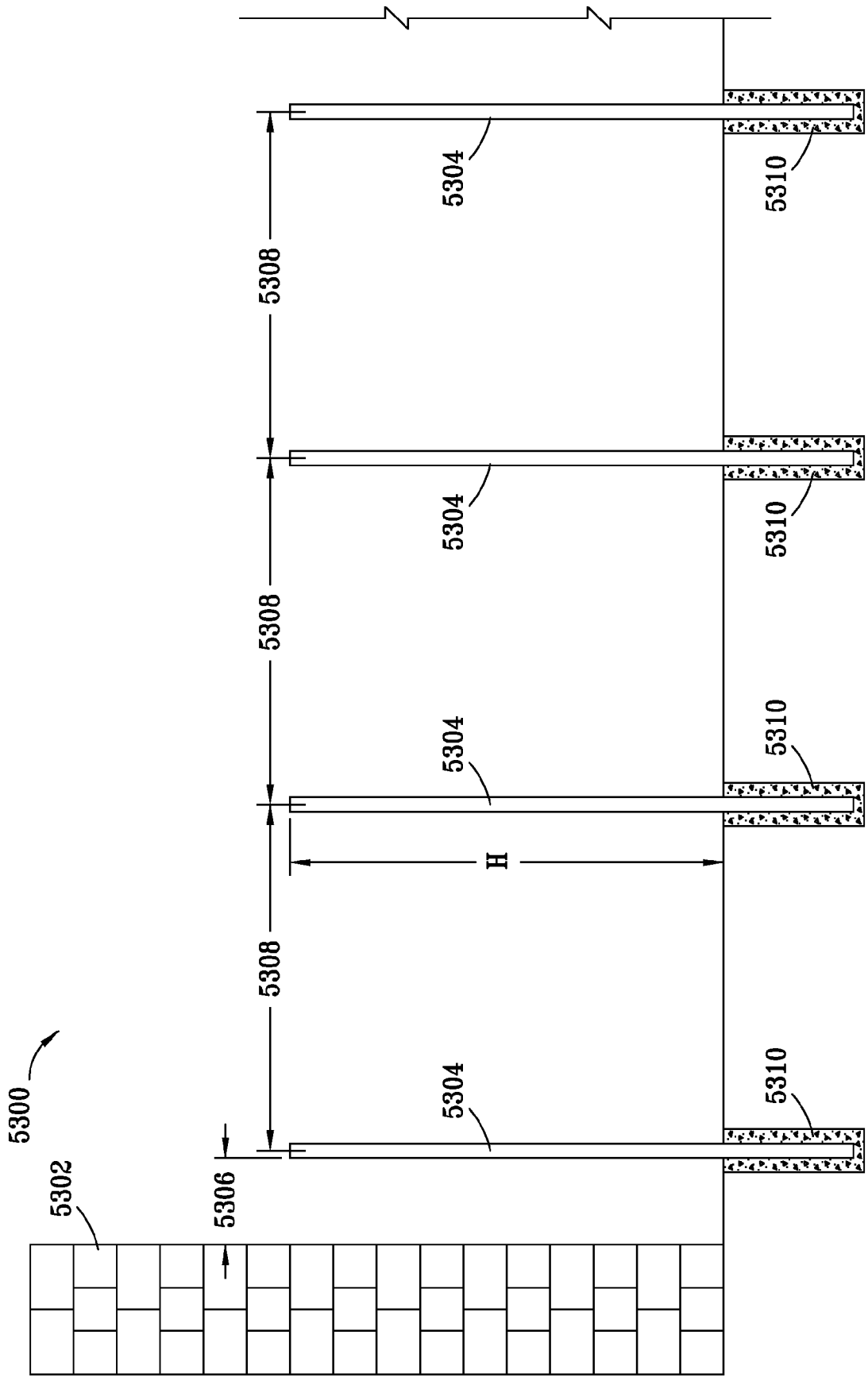
FIG. 53 exemplifies a step in the assembly wherein posts are set in place.

As shown in FIG. 53, fence posts are preferably set in cement or concrete in the ground. The posts may be of any suitable height, and regularly or irregularly spaced. The posts may be fabricated of any suitable material, such as wood, steel, aluminum, channel, square beam, I-beam, or the like effective for supporting a fence.

Figure 54:
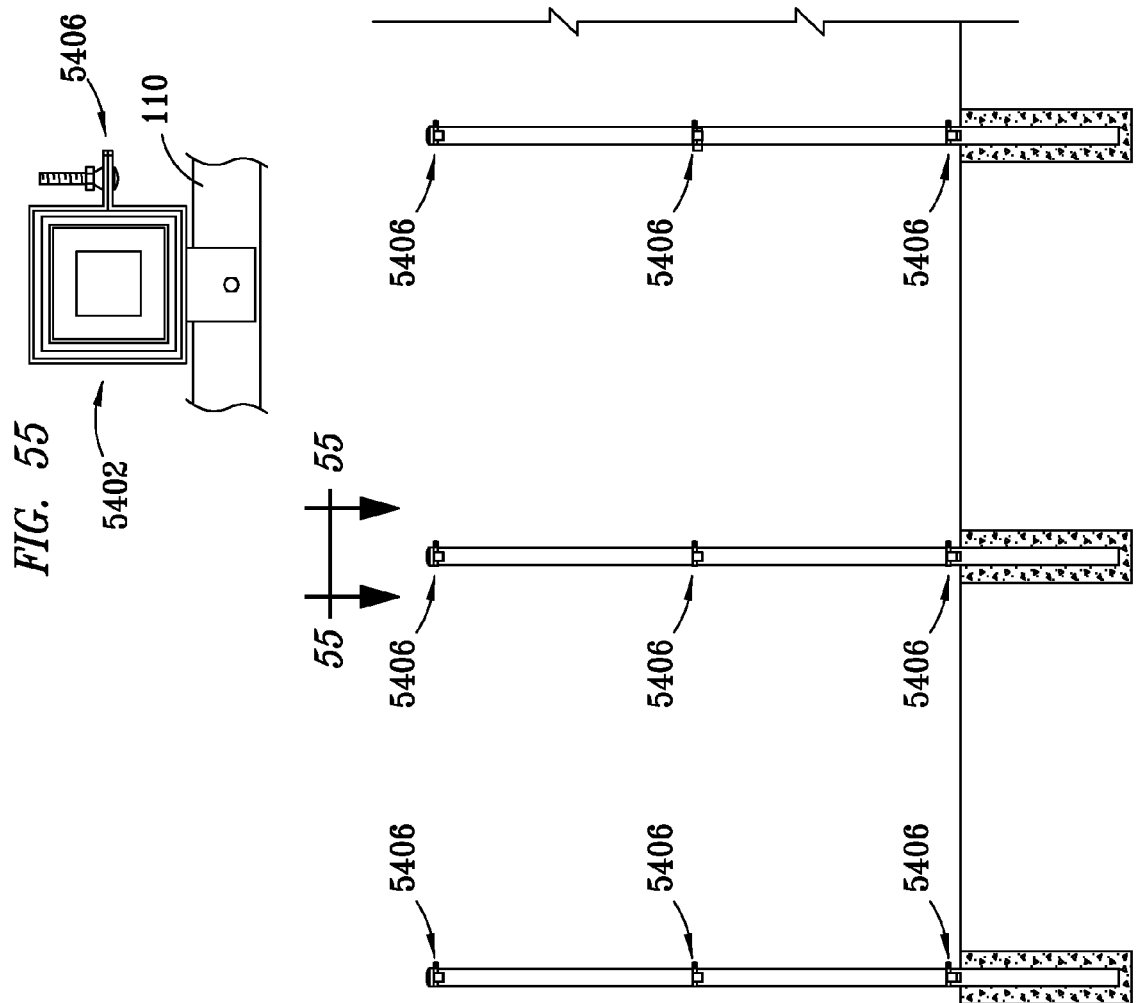
FIGS. 54-55 exemplifies a step in the assembly wherein rail hangers are installed on the posts set in FIG. 54.
Figure 55:
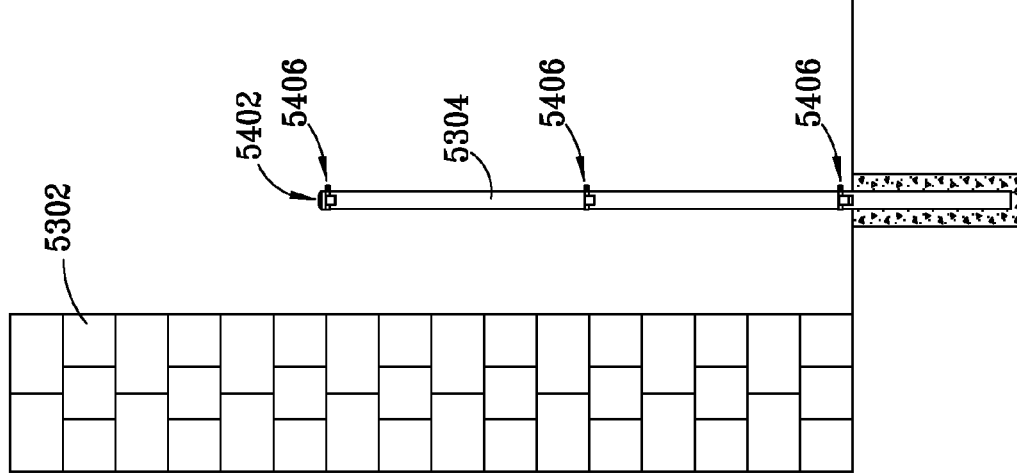
Figure 59:
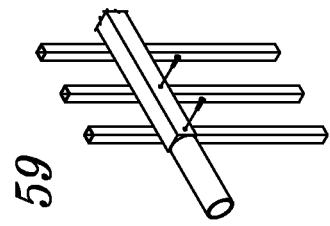
FIGS. 58-59 exemplifies the panel assemblies of FIG. 56 prepared for splice installation.
Figure 58:
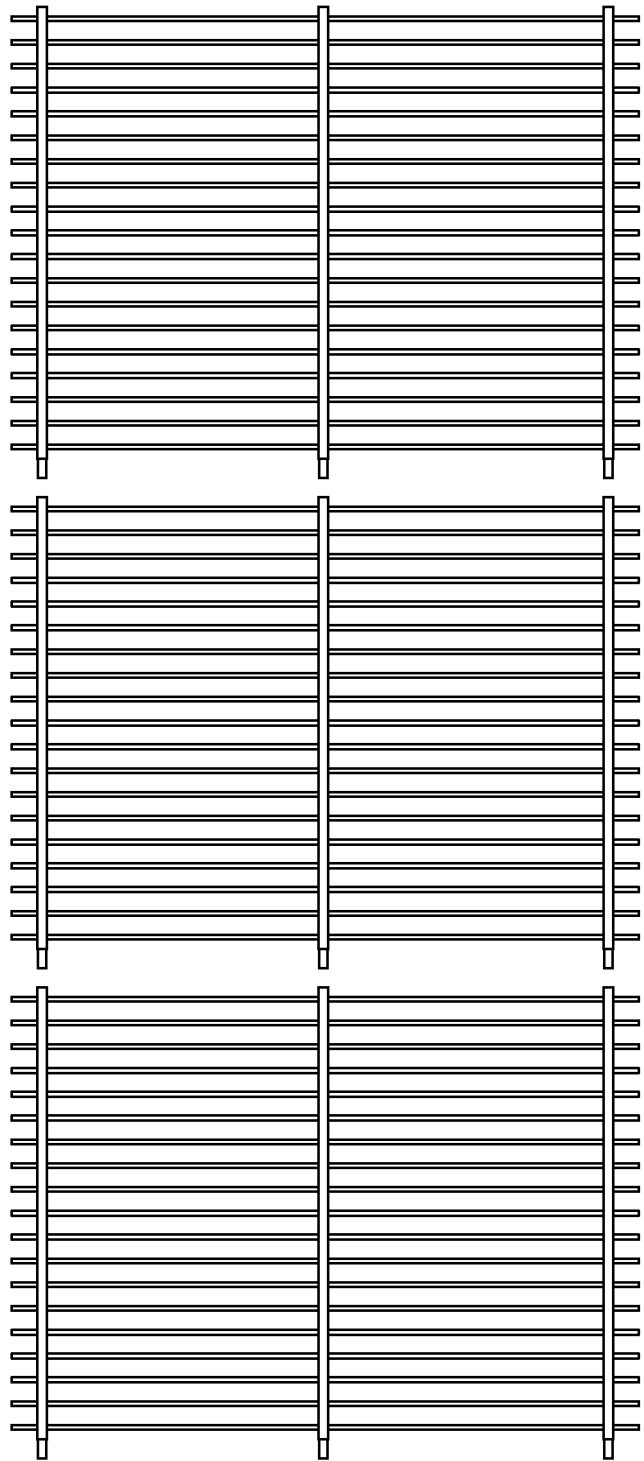

FIGS. 54-55 exemplify how rail hangers are installed on the posts set in FIG. 54. In a preferred embodiment, hangers are attached to brackets which, in turn, are attached to the posts. Band brackets, such as those shown in FIGS. 3-8, are secured to the posts to avoid the need to tap directly into the post, thereby further simplifying the assembly of the fence. Hangers for supporting rails on the panels, discussed in further detail below with respect to FIGS. 64-67, are attached to the brackets, preferably by the manufacturer of the fence product, in any suitable manner, such as, by way of example, but not limitation, welds, mechanical fasteners, or the like.

In accordance with principles of the present invention, fence panels are substantially prefabricated prior to being installed to form the fence. More specifically, the panels are fabricated in sections, each of which sections comprises a plurality of slats, also referred to as pickets, attached to rails, such as metal tubes, preferably having a square, or optionally a circular, cross-section. Then, as exemplified in FIG. 56, the panels are laid out on the ground with corresponding splices. The splices are preferably tubular, and sized for fitting within the rails. As shown in FIGS. 58-61, the splices are inserted into the respective rails, end-to-end, and preferably secured thereto using mechanical fasteners, such as TEK screws as shown in FIG. 61, thereby forming a continuous run of fence outside the line of the fence posts of FIGS. 53-54. While not shown in FIGS. 56-61, fence panels may also be fabricated with gate jambs, as needed with respect to FIGS. 69-91 below, by way of welding or mechanically fastening of the jambs to ends of rails.

Figure 62:
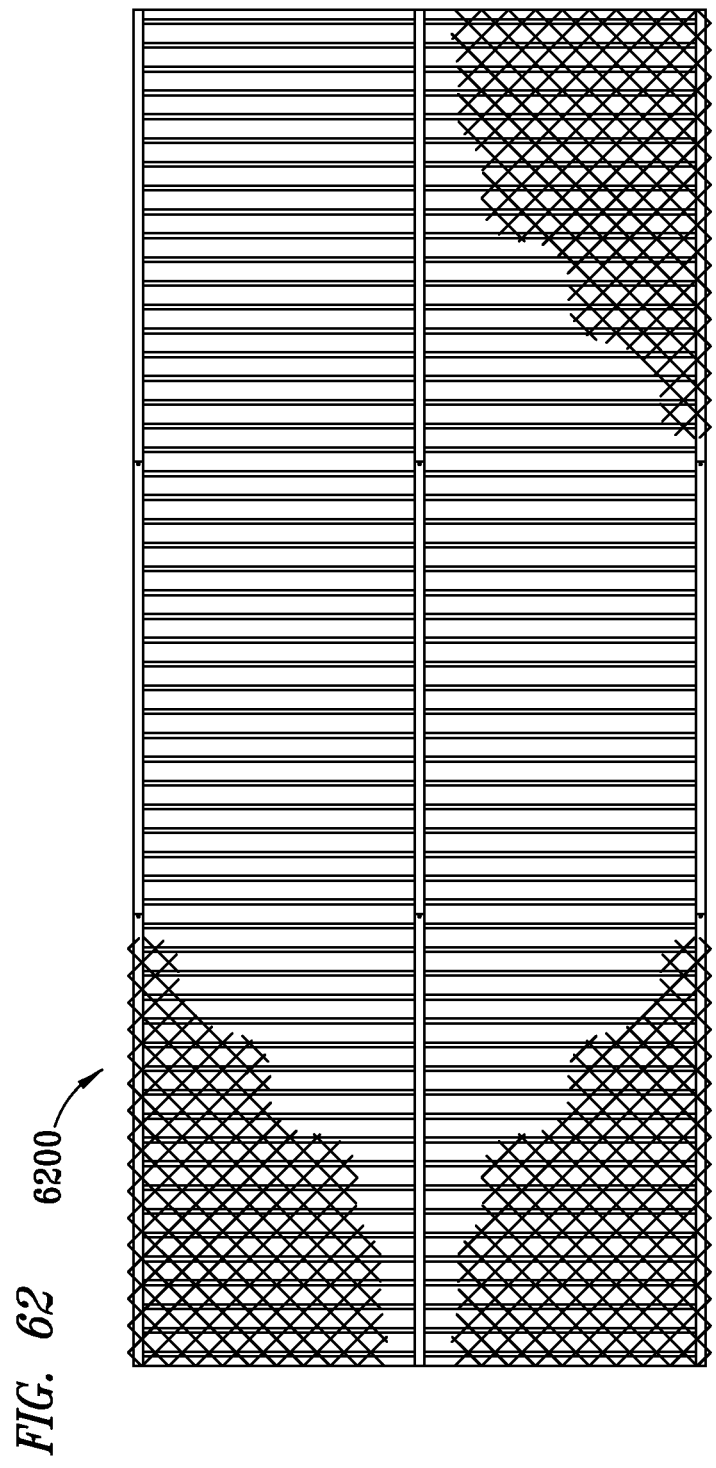
FIG. 62 exemplifies the overlay of chain link onto the assemblies of FIG. 58.

If additional security is desired, then the pickets of the fence panels may be overlaid with chain link. As shown in FIG. 62, chain is cut as desired to extend across a desired section of fence panel. Then, as shown in FIGS. 63-65, tension rod brackets are attached to ends of the fence panels, and tension rods are extended through the chain links at each end of the fence panel. Tension is then applied to the tension rods in opposing directions to thereby instill tension in the chain link, and the tension rods are secured by way of the tension rods brackets.

Figure 68:
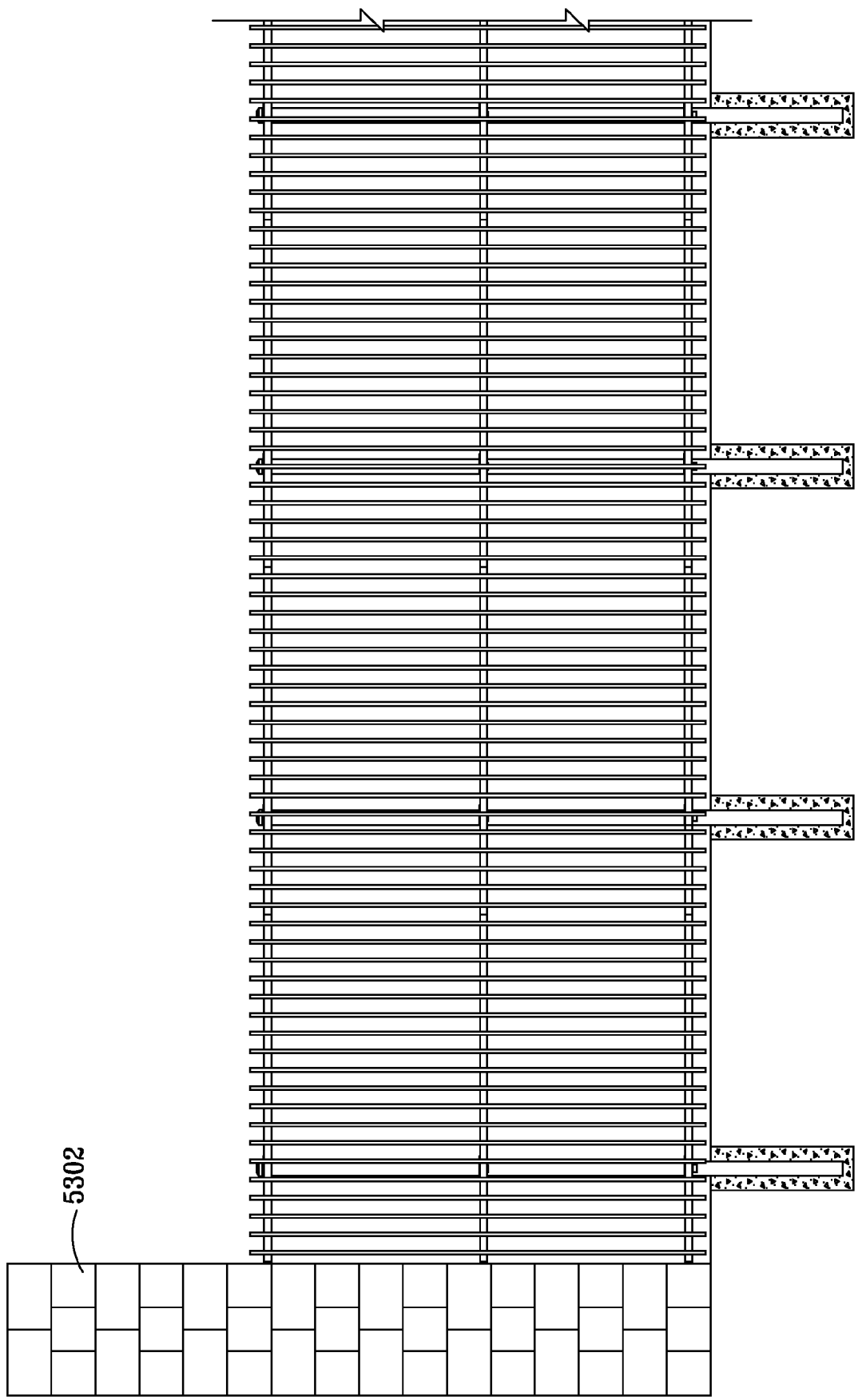
Figure 71:
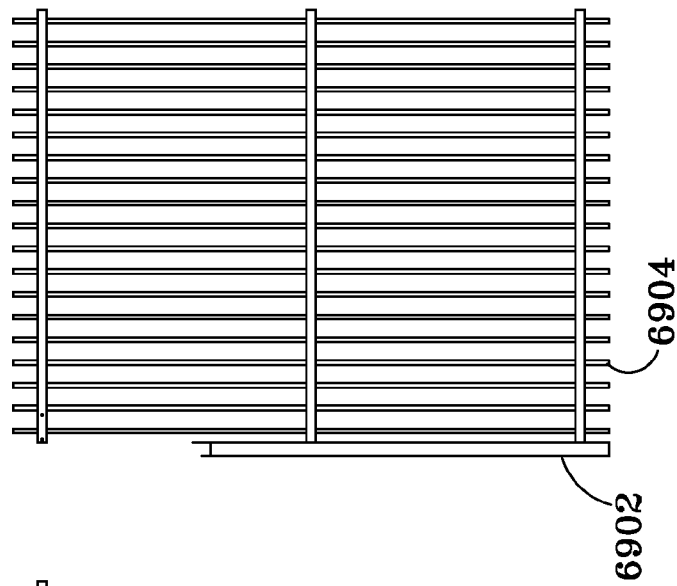
FIGS. 69-71 exemplifies a layout of gate panel assemblies prepared for assembly according to principles of the present invention.
Figure 70:
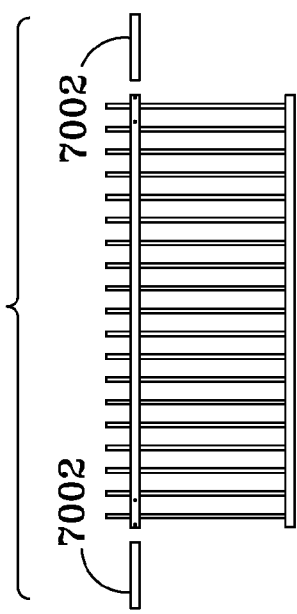
Figure 69:
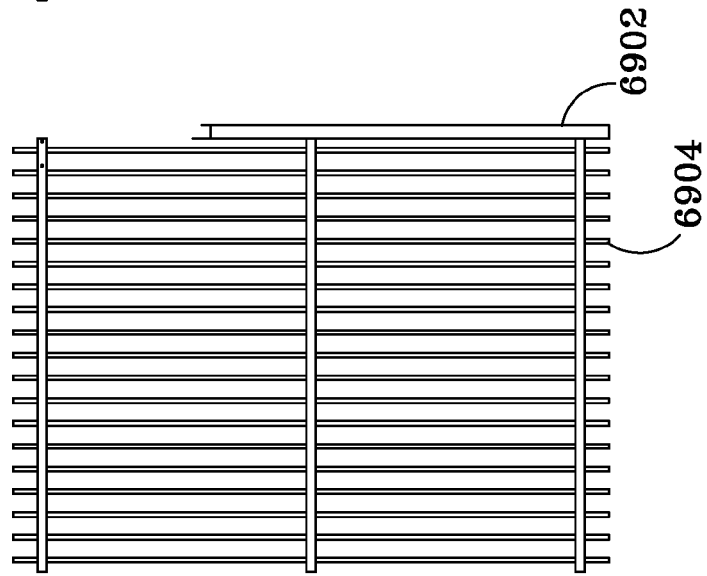
Figure 73:
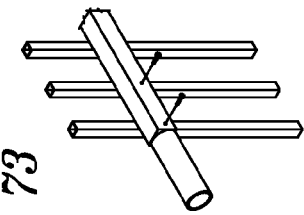
FIGS. 72-73 exemplifies the gate panel assemblies of FIGS. 69-71 prepared for splice installation.
Figure 72:
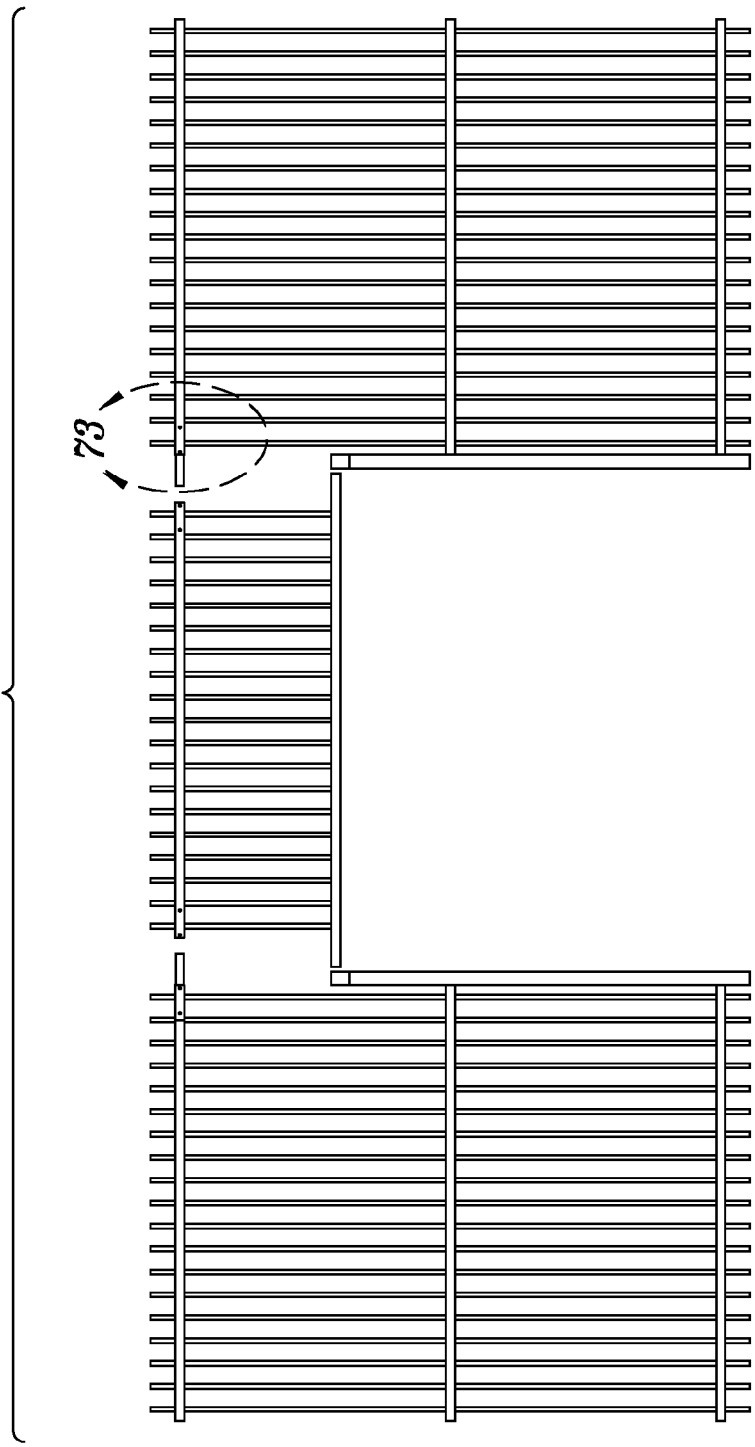
Figure 75:
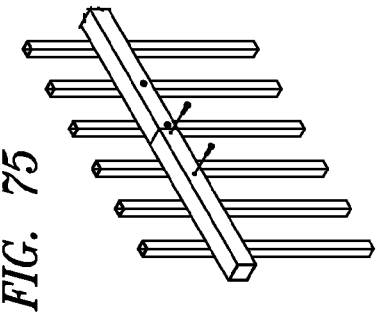
FIGS. 74-75 exemplifies the gate panel assemblies of FIGS. 69-71 pressed together.
Figure 74:
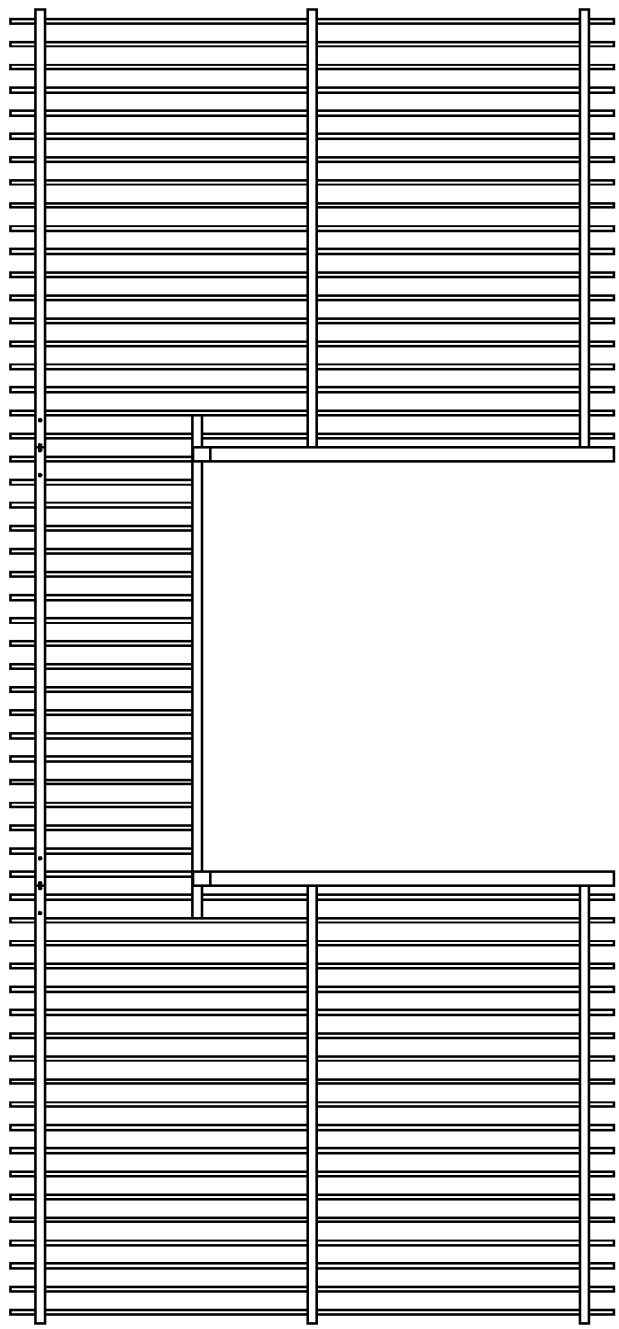

In FIGS. 66-67, a section of fence panel (with or without chain link) is lifted and positioned on the posts of FIGS. 53-54, and secured to the brackets, preferably by way of mechanical fasteners, such as TEK screws. As shown in FIG. 68, additional sections of fence panel are subsequently lifted and positioned on the posts, spliced together as described above with respect to FIGS. 56-61, and respective rails of the fence panels are secured to the rail hangers bracketed to the fence posts.

Once the fence panels are secured to the posts, gates are installed as determined with respect to FIG. 52 above. As depicted in FIGS. 69-75, selected fence panels are preferably pre-fabricated with gate jambs positioned in suitable locations for hanging a gate therefrom. Further to FIGS. 69-75, two fence panels are laid on the ground, and a third, or transom, fence panel is interposed between the two fence panels, the transom fence panel being less wide the first two fence panels. At least one rail of the transom fence panel is spliced to corresponding rails of the other two fence panels, and a lowermost rail of the transom fence panel is preferably mechanically connected, e.g., by way of a plate, to an upper end of respective gate jambs, to thereby form "gate" panels.

Figure 76:
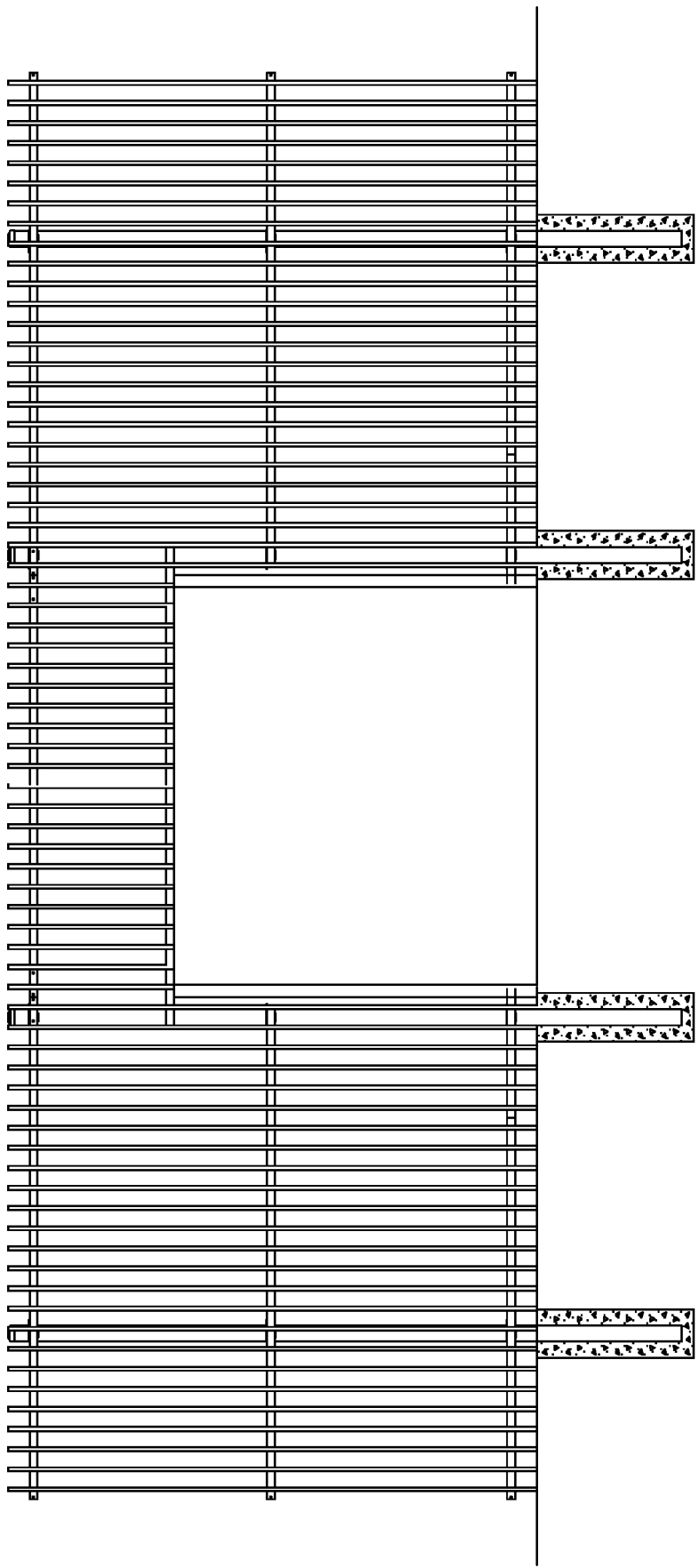
FIG. 76 exemplifies the gate panel assemblies of FIGS. 69-71 may be lifted and positioned onto the posts of FIG. 54.

As shown in FIG. 76, the gate panels are lifted, as described above with respect to FIGS. 66-68, and spliced into the fence system with other fence panel sections. A lowermost end, or base, of each gate jamb is preferably secured, e.g., by way of a mechanical fastener such an anchor bolt, to a post, or cement in which a post is embedded, for additional strength and stability.

Figure 77:
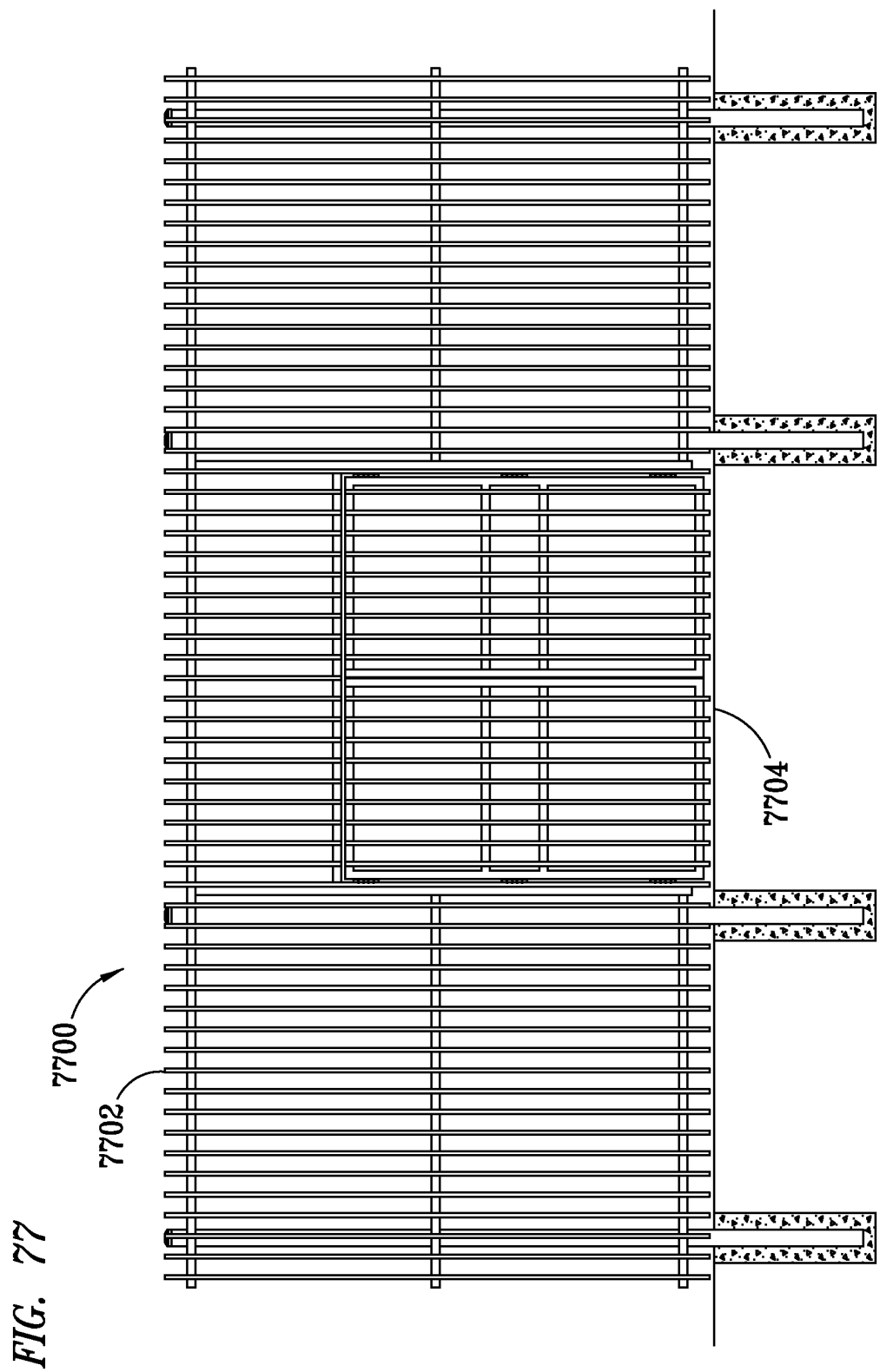
FIG. 77 exemplifies the installation of gates to the posts and panel assemblies of FIG. 76.
Figure 89:
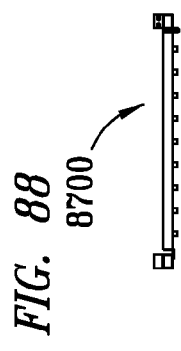
FIGS. 85-89 exemplifies an egress gate with panic hardware for a double gate with a center post and single gate.
Figure 88:
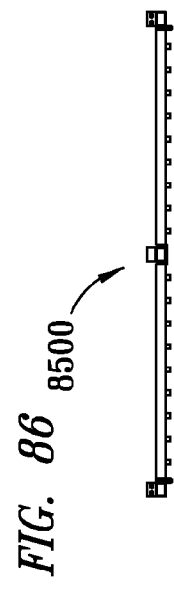
Figure 87:
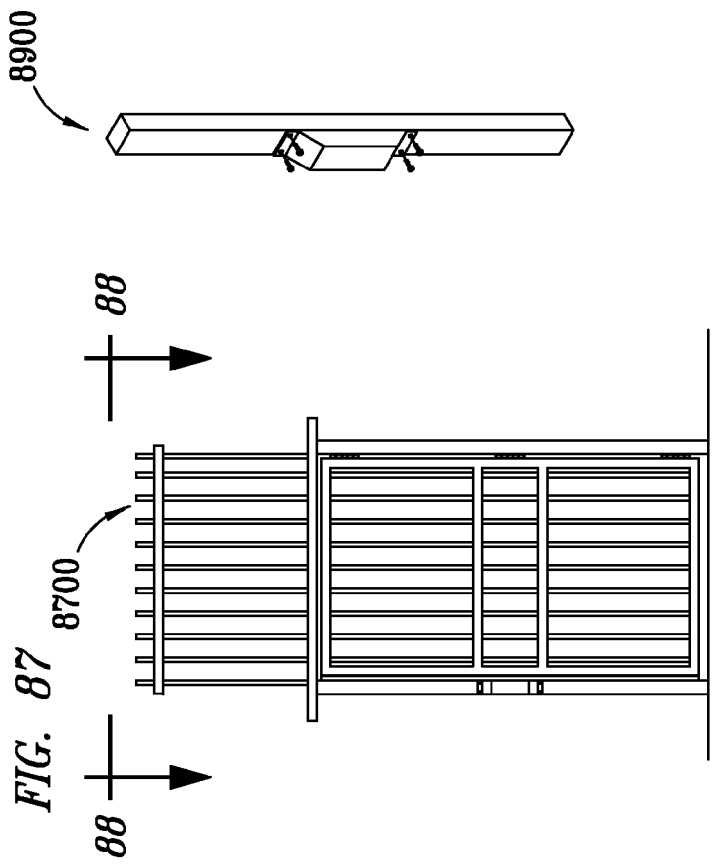
Figure 86:
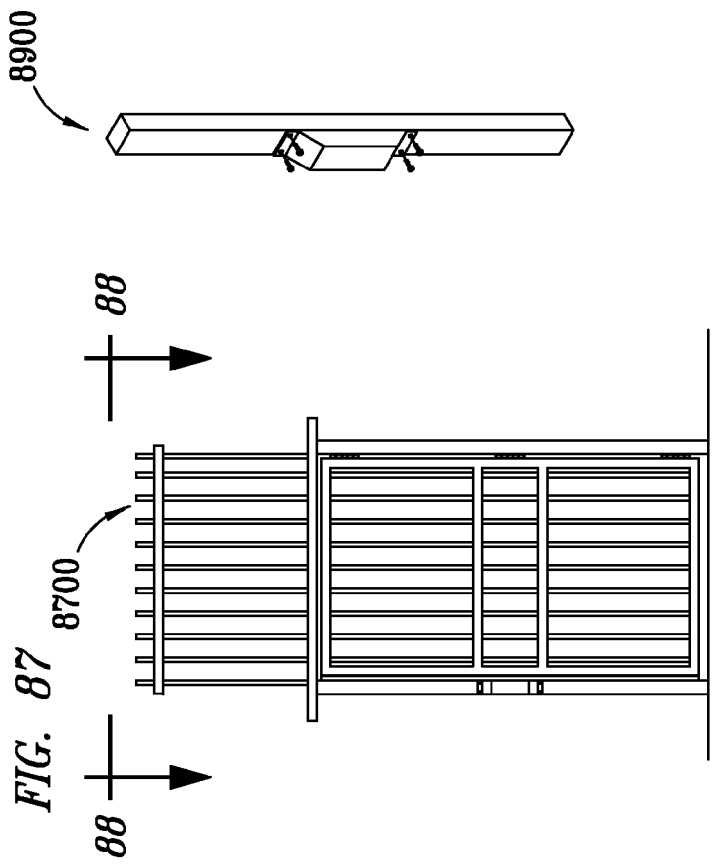
Figure 85:
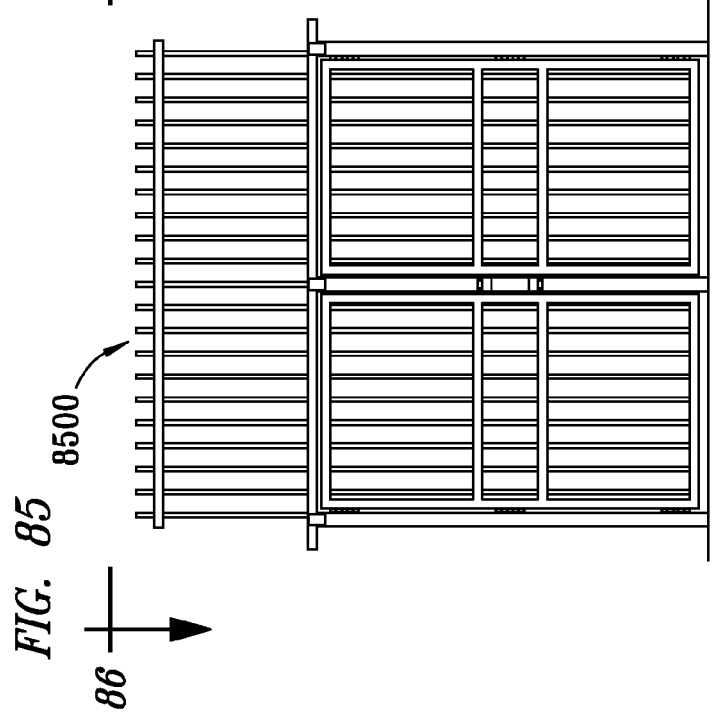

As depicted in FIG. 77, gates are secured to the gate jambs of the gate panels, by way of hinges which are preferably welded to respective gate jambs. One or more gates are thus hung on a jamb system attached to fence rails near a connection with a post, thereby enabling substantially precise control over the placement of the gate and size of the opening. If the posts are open on top, then caps are preferably positioned on the posts to close the tops thereof.

FIG. 78 exemplifies the optional installation of a center post, or mullion post, which may be positioned as suitable in support of the aforementioned gate and transom fence panel. A lower end of such a mullion post is preferably set in concrete (or cement), and an upper end thereof is preferably secured to a rail by way of a plate tack welded between the mullion post and the rail.

FIGS. 79-91 exemplify various options available for gates in accordance with principles of the present invention. More specifically, FIGS. 79-80 depict gate section construction detail for a double gate with a center post and transom. FIGS. 81-82 depict gate section construction detail for a single gate with a transom. FIGS. 83-84 depict gate section construction detail for a double gate with a drop rod and transom. FIGS. 85-89 depict an egress gate section construction detail with panic hardware for (1) a double gate with a center post and transom, and (2) a single gate with a center post and transom. FIGS. 90-91 depict gate section construction detail for a double gate with a drop rod.

By use of the present invention, a fence may be installed faster (e.g., about twice as fast) than conventional fences. Furthermore, posts that are positioned near footers may be set up to about 36 inches from a termination point of a fence line. The fence of the present invention also preferably forms a conduit for running cables through the rail system, making it very useful in high security applications that require tamper detection fiber optics and communications cables.

It is understood that the present invention may take many forms and embodiments. Accordingly, several variations may be made in the foregoing without departing from the spirit or the scope of the invention. For example, the fence may optionally be made with rails made from channel.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for assembling a fence, comprising steps of:
installing one or more fence posts;
attaching one or more brackets to the fence posts with one or more brace band attachments;
attaching one or more adjustable rail hangers to the one or more brackets;
providing two or more of fence panels, each of the two or more fence panels having one or more rails attached thereto;
splicing together the two or more fence panels to form a contiguous fence section by inserting one or more tubular splices into the one or more rails of adjacent fence panels;
positioning the contiguous fence section directly onto the one or more fence posts;
securing the contiguous fence section to the one or more fence posts by attaching the one or more rails to the one or more adjustable rail hangers attached to the one or more brackets; and
hanging one or more gates onto one or more jambs integrated with the contiguous fence section.

2. The method of claim 1, further comprising the step of overlaying an additional material on the two or more fence panels, wherein the additional material is selected from a group consisting of mesh and chain link.

3. The method of claim 1, wherein the width of the individual fence panels is unequal to the interval between two adjacent fence posts of the one or more fence posts.

4. The method of claim 1, wherein the one or more fence posts are installed in cement or concrete.

5. The method of claim 1, wherein the individual fence panels are formed using a plurality of pickets.

6. The method of claim 1, wherein each of the one or more gates is selected from a group consisting of a single gate and a double gate.

7. A system for assembling a fence, comprising:
one or more fence posts;
one or more brackets attached to the one or more fence posts using one or more brace band attachments;
one or more adjustable rail hangers attached to the one or more brackets;
two or more fence panels, each of the two or more fence panels having one or more rails attached thereto, the two or more fence panels spliced together to form a contiguous fence section by inserting one or more tubular splices into the one or more rails of adjacent fence panels; and
one or more gates hung onto one or more jambs integrated with the contiguous fence section;
wherein the contiguous fence section is positioned onto the one or more fence posts; and
wherein the contiguous fence section is secured in place by attaching the one or more rails to the one or more adjustable rail hangers attached to the one or more brackets.

8. The system of claim 7, further comprising an additional material overlayed on the plurality of fence panels, wherein the additional material is selected from a group consisting of mesh and chain link.

9. The system of claim 7, wherein the width of the individual fence panels is unequal to the interval between two adjacent fence posts of the one or more fence posts.

10. The system of claim 7, wherein the one or more fence posts are installed in cement or concrete.

11. The system of claim 7, wherein the individual fence panels is comprised of a plurality of pickets.

12. The system of claim 7, wherein each of the one or more gates is selected from a group consisting of a single gate and a double gate.

\* \* \* \* \*